United States Patent
Anae et al.

(10) Patent No.: US 10,618,494 B2
(45) Date of Patent: Apr. 14, 2020

(54) AIRBAG ASSEMBLIES WITH ANCHORED POSITIONAL TETHER

(71) Applicant: Autoliv ASP, Inc., Ogden, UT (US)

(72) Inventors: Gavin Francom Anae, Kaysville, UT (US); Michael Jay Daines, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 135 days.

(21) Appl. No.: 15/445,729

(22) Filed: Feb. 28, 2017

(65) Prior Publication Data

US 2018/0244234 A1 Aug. 30, 2018

(51) Int. Cl.
*B60R 21/2338* (2011.01)
*B60R 21/206* (2011.01)
*B60R 21/231* (2011.01)
*B60R 21/00* (2006.01)

(52) U.S. Cl.
CPC ........ *B60R 21/2338* (2013.01); *B60R 21/206* (2013.01); *B60R 2021/0051* (2013.01); *B60R 2021/23169* (2013.01); *B60R 2021/23382* (2013.01)

(58) Field of Classification Search
CPC .............. B60R 21/2338; B60R 21/206; B60R 2021/23382; B60R 2021/161; B60R 2021/23386; B60R 2021/23169; B60R 2021/0051
See application file for complete search history.

(56) References Cited

U.S. PATENT DOCUMENTS

| | | | | |
|---|---|---|---|---|
| 5,513,877 A | * | 5/1996 | MacBrien | B60R 21/233 280/732 |
| 6,170,871 B1 | * | 1/2001 | Goestenkors | B60R 21/20 280/743.1 |
| 6,315,323 B1 | * | 11/2001 | Pack, Jr. | B60R 21/233 280/735 |
| 7,275,762 B2 | * | 10/2007 | Miyata | B60R 21/16 280/730.1 |
| 7,543,848 B2 | * | 6/2009 | Webber | B60R 21/2338 280/735 |
| 7,766,374 B2 | | 8/2010 | Abele et al. | |
| 8,157,291 B2 | * | 4/2012 | Mayer | B60R 21/0134 280/735 |
| 8,500,161 B2 | * | 8/2013 | Chavez | B60R 21/206 280/730.1 |
| 2005/0151351 A1 | | 7/2005 | Enders et al. | |
| 2006/0061076 A1 | * | 3/2006 | Webber | B60R 21/2338 280/736 |

(Continued)

OTHER PUBLICATIONS

International Search Report and Written Opinion dated May 31, 2018 for PCT/US2018/018777.

*Primary Examiner* — Karen Beck
(74) *Attorney, Agent, or Firm* — Stoel Rives LLP

(57) ABSTRACT

An inflatable airbag, such as a knee airbag, including a positional strap coupled at a first end to an interior surface of the occupant-facing panel. The positional tether extends from within an inflatable chamber of the inflatable airbag and past an exterior surface of the vehicle-facing panel to couple at a second end to an anchor point that is external to the airbag. The positional tether is to be drawn taut during deployment to exert a force on the occupant-facing panel and impact a configuration of the airbag in the deployed state.

27 Claims, 16 Drawing Sheets

(56) References Cited

U.S. PATENT DOCUMENTS

| | | | |
|---|---|---|---|
| 2007/0200320 A1* | 8/2007 | Keshavaraj | B60R 21/206 |
| | | | 280/730.1 |
| 2007/0246920 A1 | 10/2007 | Abele et al. | |
| 2011/0260434 A1 | 10/2011 | Gottschalk et al. | |
| 2012/0007345 A1* | 1/2012 | Lee | B60R 21/206 |
| | | | 280/728.2 |
| 2012/0074677 A1* | 3/2012 | Hiruta | B60R 21/2338 |
| | | | 280/739 |
| 2012/0126516 A1* | 5/2012 | Choi | B60R 21/207 |
| | | | 280/730.2 |
| 2014/0191497 A1* | 7/2014 | Murakami | B60R 21/2338 |
| | | | 280/743.2 |
| 2015/0042082 A1* | 2/2015 | Koshikawa | B60R 21/203 |
| | | | 280/739 |
| 2015/0197210 A1* | 7/2015 | Abe | B60R 21/233 |
| | | | 280/729 |
| 2016/0059821 A1* | 3/2016 | Hicken | B60R 21/33 |
| | | | 280/732 |
| 2019/0193666 A1* | 6/2019 | Jost | B60R 21/232 |
| 2019/0256031 A1* | 8/2019 | Schuler | B60R 21/206 |

\* cited by examiner though the principles discussed herein may apply to other types of airbag assemblies that are designed to cushion other portions of an occupant.
AIRBAG ASSEMBLIES WITH ANCHORED POSITIONAL TETHER

TECHNICAL FIELD

The present disclosure relates generally to the field of protection systems for vehicle occupants. More particularly, the present disclosure relates to airbag assemblies, such as inflatable knee airbag assemblies with an anchored positional tether.

BACKGROUND

Protection systems have been installed in vehicles to protect an occupant during a collision event. Some protection systems suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
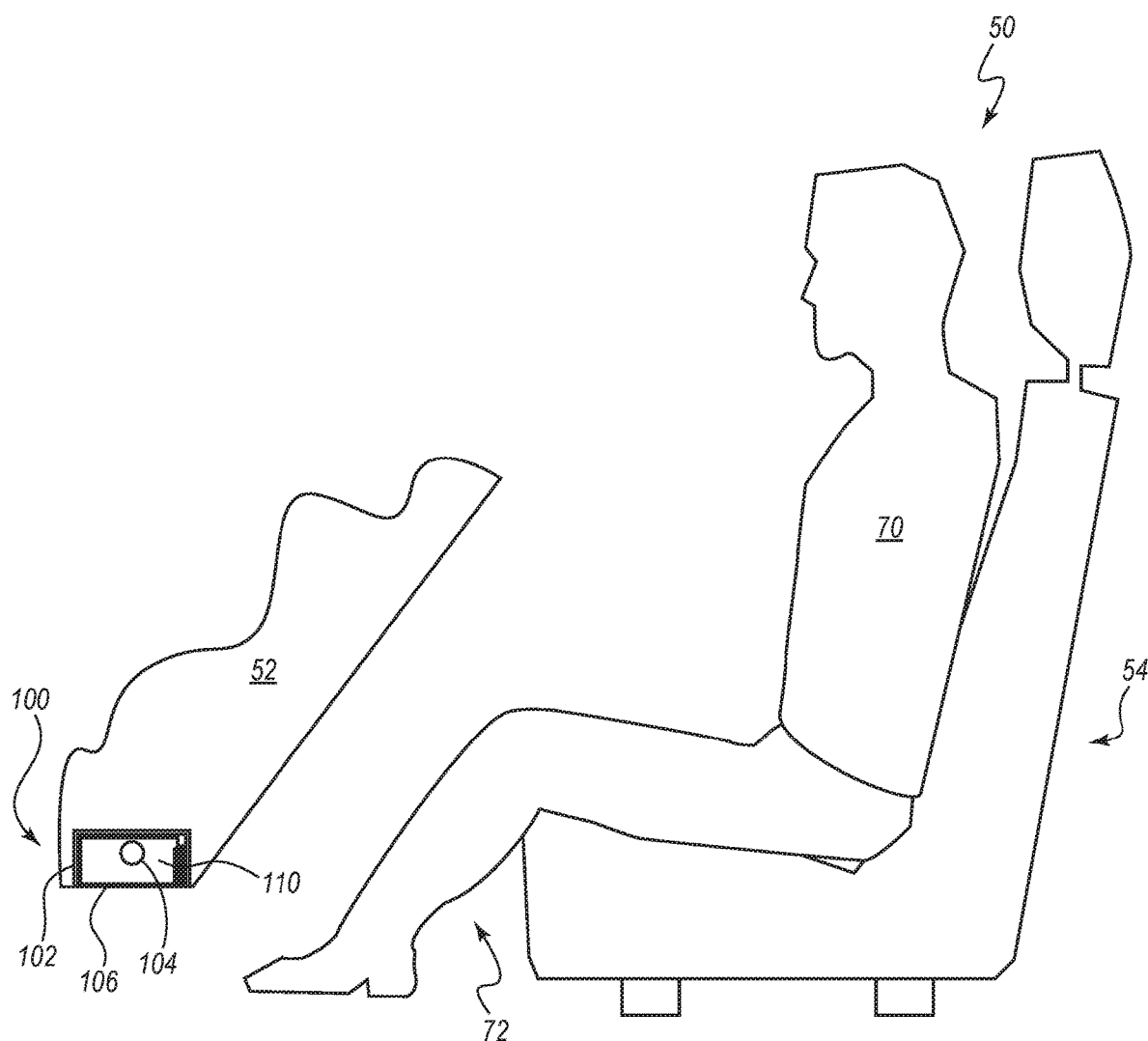
FIG. 1A is a partial side view of a vehicle seating position within a vehicle (not shown) having an inflatable knee airbag assembly in a packaged state.

Occupant protection systems, such as airbag assemblies, may be installed at various locations within a vehicle to reduce or minimize occupant injury during a collision event. In the following disclosure, specific reference is made to airbag assemblies that are designed to deploy in the direction of a knee area of an occupant seated in a vehicle seating position, although the principles discussed herein may apply to other types of airbag assemblies that are designed to cushion other portions of an occupant.

Airbag assemblies generally include an airbag cushion. The airbag cushion is typically disposed within a housing in a packaged state (e.g., rolled, folded, and/or otherwise compressed) and may be retained in the packaged state behind a cover. During a collision event, an inflator may be triggered, which rapidly fills the airbag cushion with inflation gas. The inflation gas may cause the airbag cushion to rapidly transition from a compact packaged (i.e., un-deployed) state to an expanded or deployed state. In some embodiments, the expanding airbag cushion opens an airbag cover (e.g., by tearing through a tear seam or opening a door-like structure) to exit the housing. The inflator may be triggered by any suitable device or system, and the triggering may be in response to and/or influenced by one or more vehicle sensors.

Airbag assemblies can also include a knee restraint or knee airbag to protect the knees and/or lower leg of an occupant during a collision event. Such knee restraints typically absorb some of the impact energy of an occupant during a collision event, especially by restraining the lower torso by means of applying a force to the knees. In some embodiments, the knee restraint may comprise an airbag cushion that contacts and cushions the knees of an occupant during a collision event.

Some embodiments of airbag assemblies disclosed herein may be useful for protecting occupants seated in a front seat of a vehicle. Other embodiments of the airbag assemblies disclosed herein may be particularly useful for protecting occupants who are seated rearward of the front seats of a vehicle.

For example, in some embodiments, the airbag assemblies include an airbag cushion that is deployed from a position immediately in front of the occupant at a relatively low position. For instance, the airbag cushion may deploy from an instrument panel or a seat back at a position that is level with or lower than the position of the knees of an occupant who is seated in a back seat.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The terms "connect" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrase "attached to" refers to interaction between two or more entities that are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

As used herein, the terms "forward" and "rearward" are used with reference to the front and back of the relevant vehicle. For example, an airbag cushion that deploys in a rearward direction deploys toward the back of a vehicle.

The directional terms "proximal" and "distal" are used herein to refer to opposite locations on an airbag cushion. The proximal end of an airbag cushion is the end of the airbag cushion that is closest to the inflator when the airbag cushion is fully inflated. The distal end of an airbag cushion is the end opposite the proximal end of the airbag cushion. In other words, the terms "proximal" and "distal" are with reference to a point of attachment, such as a point of attachment of the airbag cushion at an airbag assembly housing and a point of attachment of an airbag assembly at a seat back from which an airbag deploys. Specifically, "proximal" is situated toward such point of attachment and "distal" is situated away from such point of attachment.

The term "seat," as used herein, refers to a structure within the cabin of a vehicle installed such that an occupant may be seated thereon/therein for transport within the vehicle.

The term "front seat," as used herein, refers to any seat that is disposed immediately rearward of the instrument panel, regardless of whether disposed to either side of the vehicle, and which is disposed forward of any "back seat(s)" (defined below) which may be present in the vehicle.

The term "back seat," as used herein, refers to any seat that is disposed rearward of the front seat(s) of a vehicle, regardless of whether the seat is the most rearward seat in the vehicle. The term "back seat" also refers to any seat that is disposed rearward of other back seats.

A "vehicle seating position" may be defined by a seat (e.g., front passenger seat, a front driver seat, a back seat) of a vehicle. A vehicle seating position may be the position in which an occupant is generally positioned when seated in a seat of a vehicle. A vehicle seating position may also be a position in which an occupant may be seated prior to and/or during a collision event or a position in which the vehicle and/or the seat is designed to transport an occupant.

The term "vehicle" may refer to any vehicle, such as a car, truck, bus, airplane, etc.

The term "lower instrument panel" generally refers to an occupant-facing structure within a vehicle located immediately forward of any front seat(s) and situated so as to support any number of secondary occupant-facing features (such as a lower glove box, heating/cooling vents, etc.) and positioned below that portion of the instrumental panel supporting any number of primary occupant-facing features (such as vehicle instrumentation, entertainment or navigation display(s), upper glove box, etc.). In the case of the drive side, the "lower dash" would include the area under and around the steering column. The lower instrument panel may conceal wiring, ducting, and other service components, and generally extends downward toward, but not to, the floor of the vehicle. The lower instrument panel may include a cosmetically consistent panel and/or a cosmetically agnostic "undercover."

The term "occupant" generally refers to a person within a vehicle. The term "occupant" can also include a crash test dummy within a vehicle.

The term "lower leg" as used throughout this disclosure refers to that portion of an occupant from the knee down to the foot, inclusive of the knee, the lower leg proper, and the foot. Each of these, the knee, lower leg proper, and foot, includes all relevant musculoskeletal components (such as patella, menisci, tibia, fibula, gastrocnemius m., flexor complex, phalanges, metatarsals, fibularis complex, etc.). Although the "lower leg" includes the "lower leg proper," references in this disclosure to "lower leg" does not refer exclusively to the lower leg proper, but to the entirety of the anatomy from the knee downward.

FIG. 1A is a partial side view of vehicle seating position 50 within a vehicle (not shown) having an inflatable knee airbag assembly 100 in a packaged state. An occupant 70 is shown seated in an upright position in an occupant seat 54. The occupant's 70 lower leg 72 is shown. A lower instrument panel 52 of the vehicle is depicted. The lower instrument panel 52 may be part of a unitary instrument panel and/or dashboard assembly, or may be a separate component of the vehicle (distinct from and coupled to an instrument panel or upper instrument panel). An airbag cushion 110 of the knee airbag assembly 100 is compressed and packaged within a housing 102. The knee airbag assembly 100 can include the airbag cushion 110, the housing 102, an inflator 104, and a covering 106. The airbag cushion 110 is further described below. The housing 102 is a component of the airbag assembly 100 which may support and contain the airbag cushion 110 and other components of the airbag assembly 100. The housing 102 may be mounted to a structure or component of the vehicle. The inflator 104 includes a container (not shown) for the chemicals or system that generates the inflation gases, as well as any ducting or plumbing to communicate the inflation gases to the airbag cushion 110 and other related components. The inflator 104 may be partially or completely within the housing 102. In some instances, the inflator 104 may be external to the housing 102. In some embodiments, the housing 102 may include the covering 106. In some embodiments, the covering 106 may be a part of the lower instrument panel 52. Or, when the knee airbag assembly 100 serves a rear-located vehicle seating position, the covering 106 may be a part of a lower seat back. The covering 106 may be formed by a burst seam, tear seam, hinged panel, or any other suitable means. The knee airbag assembly 100, in at least some embodiments, may be mounted within the lower instrument panel 52. In another embodiment, the knee airbag assembly 100 may be mounted in or on the lower portion of a seat back of a seat of a forward-located vehicle seating position (not shown, but if FIG. 1A is viewed as a rear-located vehicle seating position, then 52 can effectively represent a seat back). In the compressed and packaged state, the airbag cushion 110 may be disposed within the housing 102 and behind the covering 106. The knee airbag assembly 100 may be triggered by one or more sensors (not shown) on any pre-determined event, such as a collision. When the knee airbag assembly 100 is activated, the covering 106 may be opened by the resulting force of inflation of the airbag cushion 110 (e.g., forces of inflation gasses), or by any other suitable means.

Figure 1B:
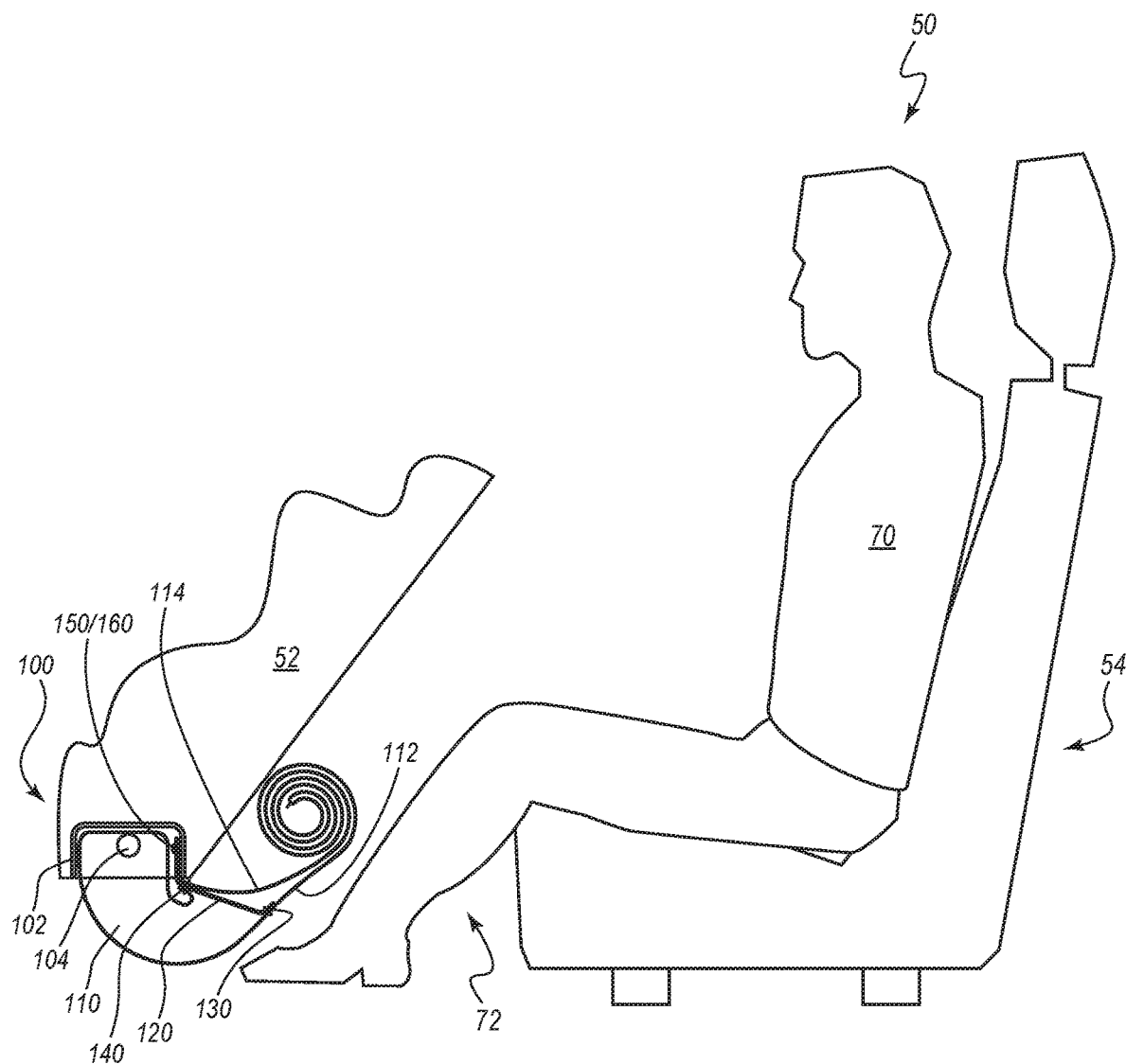
FIG. 1B is a partial side view of a vehicle seating position within a vehicle having the inflatable knee airbag assembly of FIG. 1A in the process of deploying.

FIG. 1B is a partial side view of vehicle seating position 50 within a vehicle (not shown) having the inflatable knee airbag assembly 100 of FIG. 1A in the process of deploying. The occupant 70 continues to be seated in the vehicle seating position 50 in a seat 54 of the vehicle. The knee airbag assembly 100 has begun deploying from the housing 102 by action of the inflator 104. In other words, the inflator 104 has been triggered by a pre-defined event, such as a collision event. The triggering of the inflator 104 causes the inflator 104 to generate inflation gases. The inflator 104 is in fluid communication with the airbag cushion 110. The inflation gases generated from the inflator 104 are communicated to the airbag cushion 110. As the inflation gases from the inflator 104 begin to inflate the airbag cushion 110, the airbag cushion 110 may force open the covering (not shown, but see, e.g., 106 in FIG. 1A) in order to exit the housing 102. In FIG. 1B, the airbag cushion 110 is shown partially inflated.

The airbag cushion 110 includes at least an occupant-facing panel 112 and a vehicle-facing panel 114. In some embodiments, the airbag cushion 110 may be formed from a single piece of fabric by means of unitary construction involving appropriate cutting, seams, etc. In other embodiments, the airbag cushion 110 may be formed by coupling together multiple fabric panels by means of seams. Although reference is made to the occupant-facing panel 112 and the vehicle-facing panel 114, these may be distinct fabric panels coupled together to form an inflatable chamber, or they may represent opposite aspects of a unitary-construction airbag so formed as to create the inflatable chamber. Seams may be formed by sewing, adhesive, taping, radio-frequency (RF) welding, or any other suitable means. Additionally, seams may be airtight or gas-permeable, depending on the specific application of the particular seam.

The airbag cushion 110 may also include at least one positional tether 120. The positional tether 120 includes a first end 130 coupled at an interior surface of the occupant-facing panel 112. The positional tether 120 includes a second end 150 coupled at an anchor point 160 external to the airbag cushion 110. The positional tether 120 may pass through the vehicle-facing panel 114 at a transition port 140. The transition port 140 may incorporate an airtight seam (not shown) such that the positional tether 120 may extend and pass from the interior of the airbag cushion 110 through the vehicle-facing panel 114 to the exterior of the airbag cushion 110. In other words, the positional tether 120 couples at an interior surface of the occupant-facing panel 112 and passes through the inflatable chamber 111 (not shown, but see FIG. 1C) of the airbag cushion 110, then through the transition port 140 of the vehicle-facing panel 114, then to the anchor point 160 external to the airbag cushion 110.

Figure 1C:
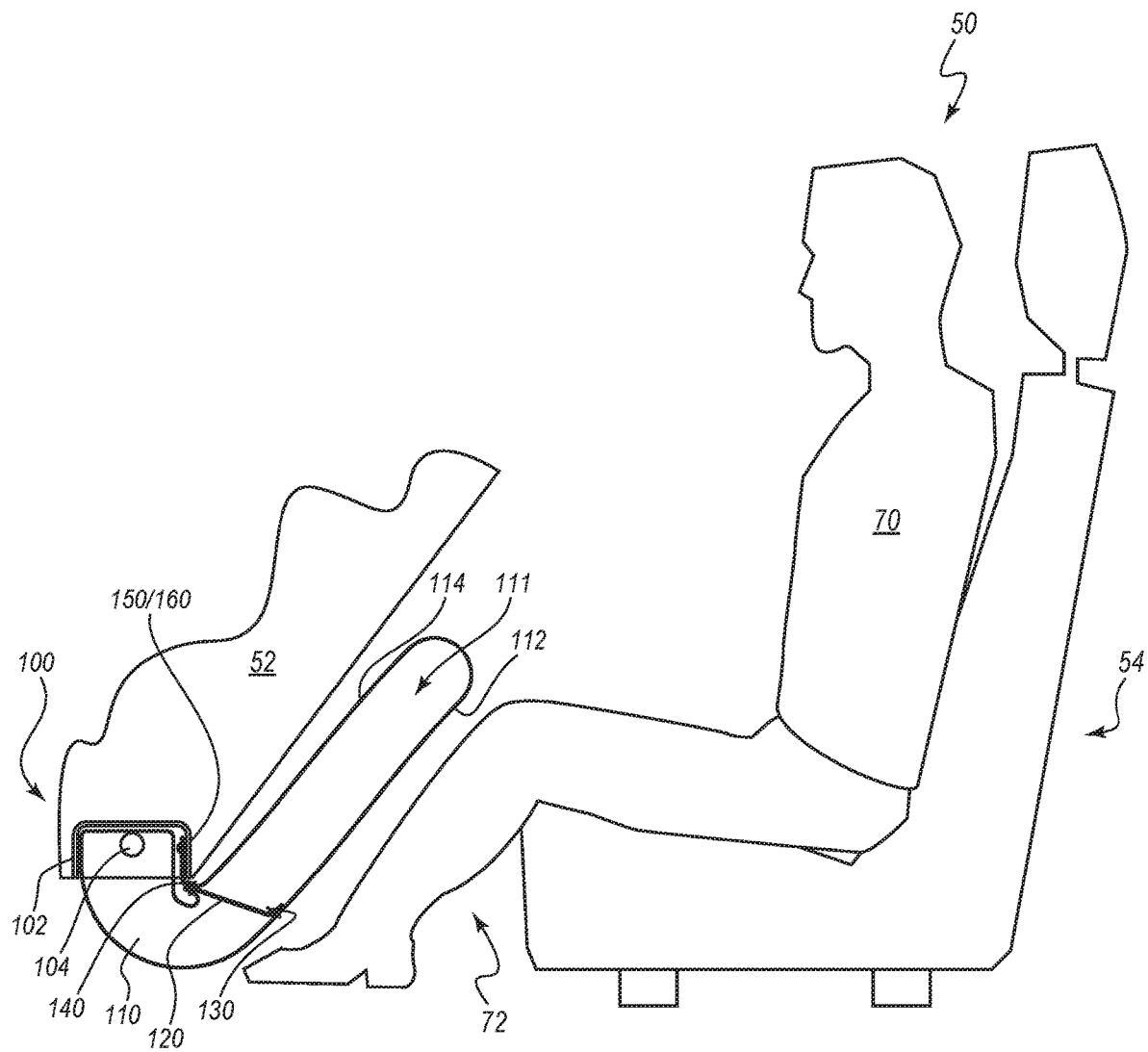
FIG. 1C is a partial side view of the vehicle seating position within a vehicle having the inflatable knee airbag assembly of FIG. 1A in a deployed and inflated state.

FIG. 1C is a partial side view of the vehicle seating position 50 within a vehicle having the inflatable knee airbag assembly 100 of FIG. 1A in a deployed and inflated state. For clarity, FIG. 1C is drawn in an exaggerated state showing excessive gap between the knees, airbag, and IP (or lower dash, or glove box). The occupant 70 is shown seated and upright in an occupant seat 54. The airbag cushion 110 has been inflated by operation of the inflator 104. The airbag cushion 110 includes a vehicle-facing panel 114 oriented toward the lower instrument panel 52 and an occupant-facing panel 112. The occupant-facing panel 112 and vehicle-facing panel 114 may be coupled together so as to form an inflatable chamber 111. In the embodiment shown, the positional tether 120 is coupled at the first end 130 to an interior surface of the occupant-facing panel 112, passes through the inflatable chamber 111 of the airbag cushion 110, then passes through the transition port 140 in the vehicle-facing panel 114 and couples at the second end 150 to the anchor point 160. As further described elsewhere herein, the positional tether 120 may include a single, continuous segment from the first end 130 to the second end 150, or may be formed of multiple segments.

In the instant embodiment, the anchor point 160 is within and part of the housing 102. In other embodiments, the anchor point 160 may be without and part of the housing 102, or may be located at some other position. For example, the anchor point 160 may couple to a structure of the vehicle adjacent to or near the housing 102. In yet other embodiments, the anchor point 160 may be another surface of the airbag cushion 110. The second end 150 of the positional tether 120 may be located at any convenient location, whether inside or outside of the housing, or located on the IP or cross-car beam for the vehicle. The positional tether 120 may assist in properly disposing the airbag cushion 110 forward of the lower leg(s) 72 of the occupant 70 such that the lower leg(s) 72 may be cushioned from impacting the lower instrument panel 52 during, for example, a collision event, thereby preventing or reducing injury to the lower leg(s) 72, and providing restraint to the lower torso.

Figure 2A:
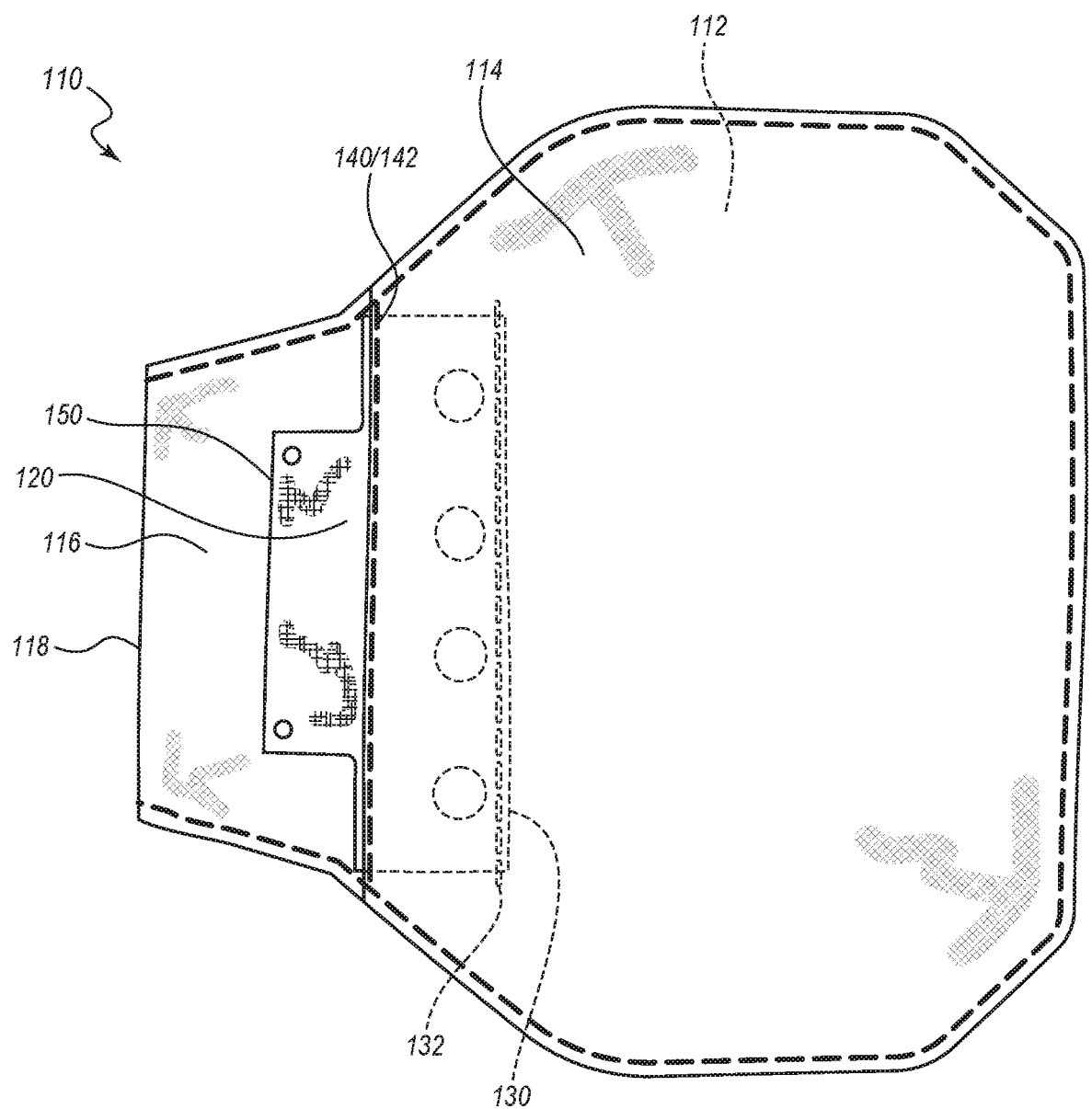
FIG. 2A is a top view of the airbag cushion of FIGS. 1A-1C in an uncompacted and uninflated condition, and separated from the housing.

FIG. 2A is a top view of the airbag cushion 110 of FIGS. 1A-1C in an uncompacted and uninflated condition, and separated from the housing 102 (shown in FIGS. 1A-1C). In other words, the airbag cushion 110 is shown deployed, deflated, and laid flat. The airbag cushion 110 includes the occupant-facing panel 112, the vehicle-facing panel 114, a throat panel 116 (or base panel), and the positional tether 120. In some embodiments, the occupant-facing panel 112, the vehicle-facing panel 114, and the throat panel 116 may be formed of a single, unitary piece of fabric cut and folded so as to form the inflatable chamber 111 (not shown, but see FIG. 1C) of the airbag cushion 110. In other embodiments, the vehicle-facing panel 114 and the throat panel 116 may be formed of one fabric panel, while the occupant-facing panel 112 may be another fabric panel, with the two panels coupled together in an appropriate manner to form the inflatable chamber of the airbag cushion 110. In yet other embodiments, the occupant-facing panel 112, the vehicle-facing panel 114, and the throat panel 116 may each be a distinct fabric panel with the three fabric panels coupled together so as to form the inflatable chamber of the airbag cushion 110. The vehicle-facing panel 114 and the throat panel 116, whether formed of a single fabric panel or multiple fabric panels, meet, couple, or transition to each other at a transition interface 142. The transition interface 142 includes the transition port 140. In any of these embodiments, the occupant-facing panel 112 and the throat panel 116 may couple at a proximal edge 118 to the housing.

The positional tether 120 includes a first end 130 and a second end 150. The first end 130 of the positional tether 120 is distal to the proximal edge 118 of the airbag cushion 110. The second end 150 is, relative to the first end 130, more proximal to the proximal edge 118. The first end 130 of the positional tether 120 couples to the occupant-facing panel 112 at a distal interface 132. The positional tether 120 couples to the vehicle-facing panel 114 and/or the throat panel 116 at the transition port 140 and/or the transition interface 142. That portion of the positional tether 120 from the first end 130 and/or the distal interface 132 to the transition port 140 and/or the transition interface 142 lies between the two panels 112, 114. That portion of the positional tether 120 between the transition port 140 and/or the transition interface 142 to the second end 150 lies on top of the throat panel 116.

Figure 2B:
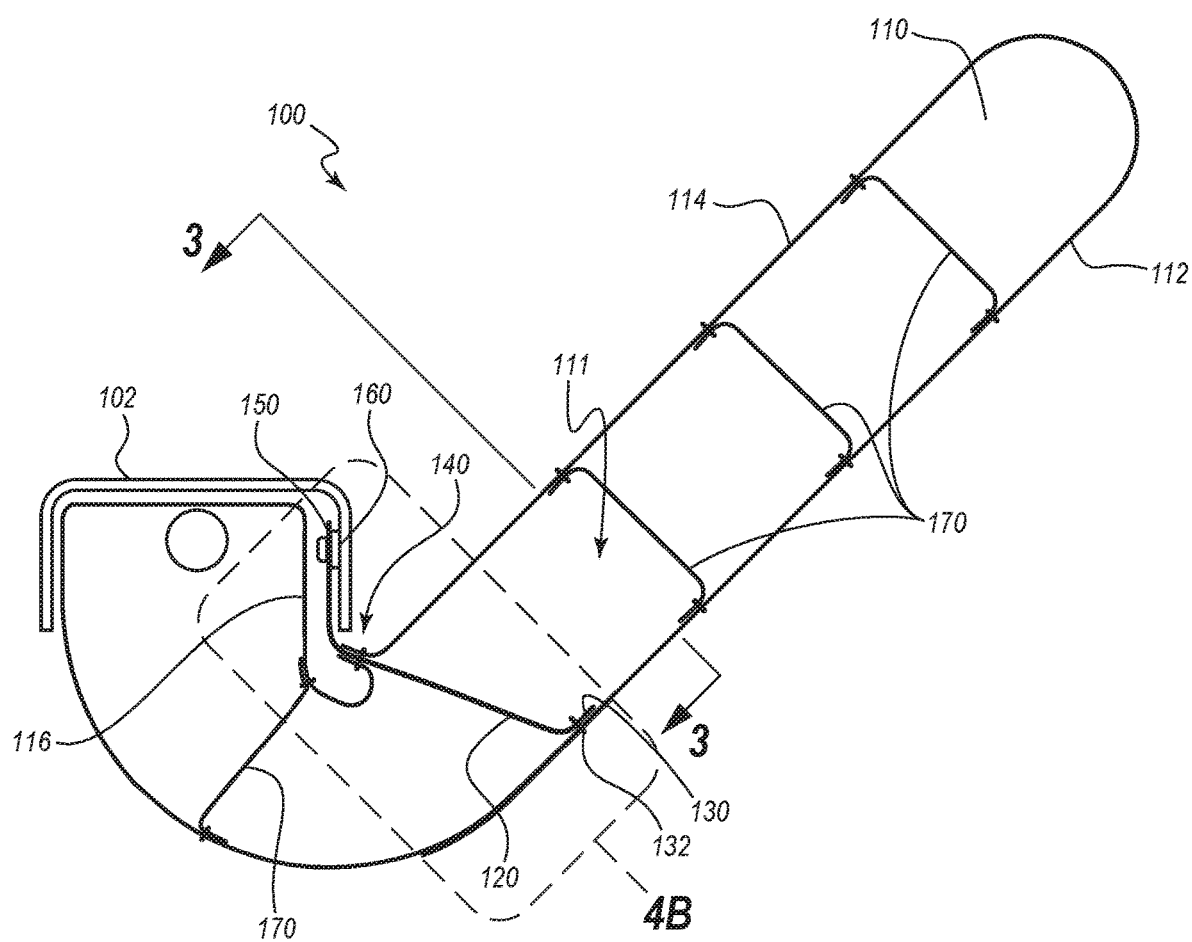
FIG. 2B is a longitudinal cross-sectional view of the knee airbag assembly of FIG. 1A with the airbag cushion deployed and inflated.

FIG. 2B is a longitudinal cross-sectional view of the knee airbag assembly 100 of FIG. 1A with the airbag cushion 110 deployed and inflated. The airbag cushion 110 includes the occupant-facing panel 112, the vehicle-facing panel 114, and the throat panel 116. The panels 112, 114, 116 couple together to form the inflatable chamber 111 of the airbag cushion 110. In some embodiments, the throat panel 116 may extend from the transition port 140 to a position in the housing 102 where the throat panel 116 may terminate, or may couple to an end of the occupant-facing panel 112. In other embodiments, the throat panel 116 and the occupant-facing panel 112 may couple external to the housing 102 at any appropriate location. In yet other embodiments, the airbag cushion 110 may be formed by a single-piece construction method wherein the throat panel 116, the occupant-facing panel 112, and the vehicle-facing panel 114 are formed of one piece of fabric cut and sewn to form the inflatable chamber 111 of the airbag cushion 110.

The positional tether 120 couples at the first end 130 at a distal interface 132 to an interior surface of the occupant-facing panel 112. The positional tether 120 passes through the inflatable chamber 111 of the airbag cushion 110, then couples to and passes through the transition port 140. The positional tether 120 then couples at the second end 150 to the anchor point 160. The positional tether 120 may help to properly dispose the airbag cushion 110, for example, upward and forward of a vehicle seating position. In other words, as the airbag cushion 110 first begins to deploy from the housing 102, the airbag cushion 110 has a downward trajectory. The positional tether 120, and more specifically the portion of the positional tether 120 between the anchor point 160 and the transition port 140, may be drawn taut and thereby facilitate transition, or "turning," of the airbag cushion 110 from its initial downward trajectory to an upward trajectory by pulling the airbag cushion 110 forward (relative to the vehicle) as the airbag cushion 110 descends from the housing 102. As the airbag cushion 110 continues to deploy and inflate, the entire length of the positional tether 120 may be drawn taught to further transition or "turn" the airbag cushion 110 toward an upward trajectory, thereby helping to properly dispose the airbag cushion 110, for example, forward of a vehicle seating position 50. Stated otherwise, the positional tether 120 may turn or curve the airbag cushion 110 to give it a longitudinal profile (e.g., a profile lying within a sagittal plane from a perspective of the seating position) that curves from the housing 102 toward the instrument panel or the back of the seat 54 in which the knee airbag assembly 100 is mounted, or otherwise more in a direction toward the anchor points 160.

In addition to the occupant-facing panel 112, the vehicle-facing panel 114, and the positional tether 120, the airbag cushion 110 may include section panels 170 (or section tethers) on the interior of the airbag cushion 110 at various locations to configure a desired cross-sectional form of the airbag cushion 110 for receiving a vehicle occupant. The section panel 170 may be oriented at right angles to the occupant-facing panel 112 and the vehicle-facing panel 114, as illustrated. In other embodiments, the section panel 170 may be oriented at any other suitable angle relative to the occupant-facing panel 112 and the vehicle-facing panel 114.

For illustration purposes, the airbag cushion 110 of FIG. 2B is depicted with straight lines—i.e. that the occupant-facing panel 112 and the vehicle-facing panel 114 are parallel and providing uniforms surfaces. As can be appreciated, a pressurized cushion may result in bulging of the occupant-facing panel 112 and the vehicle-facing panel 114 between the section panels, presenting a non-uniform surface.

Figure 3:
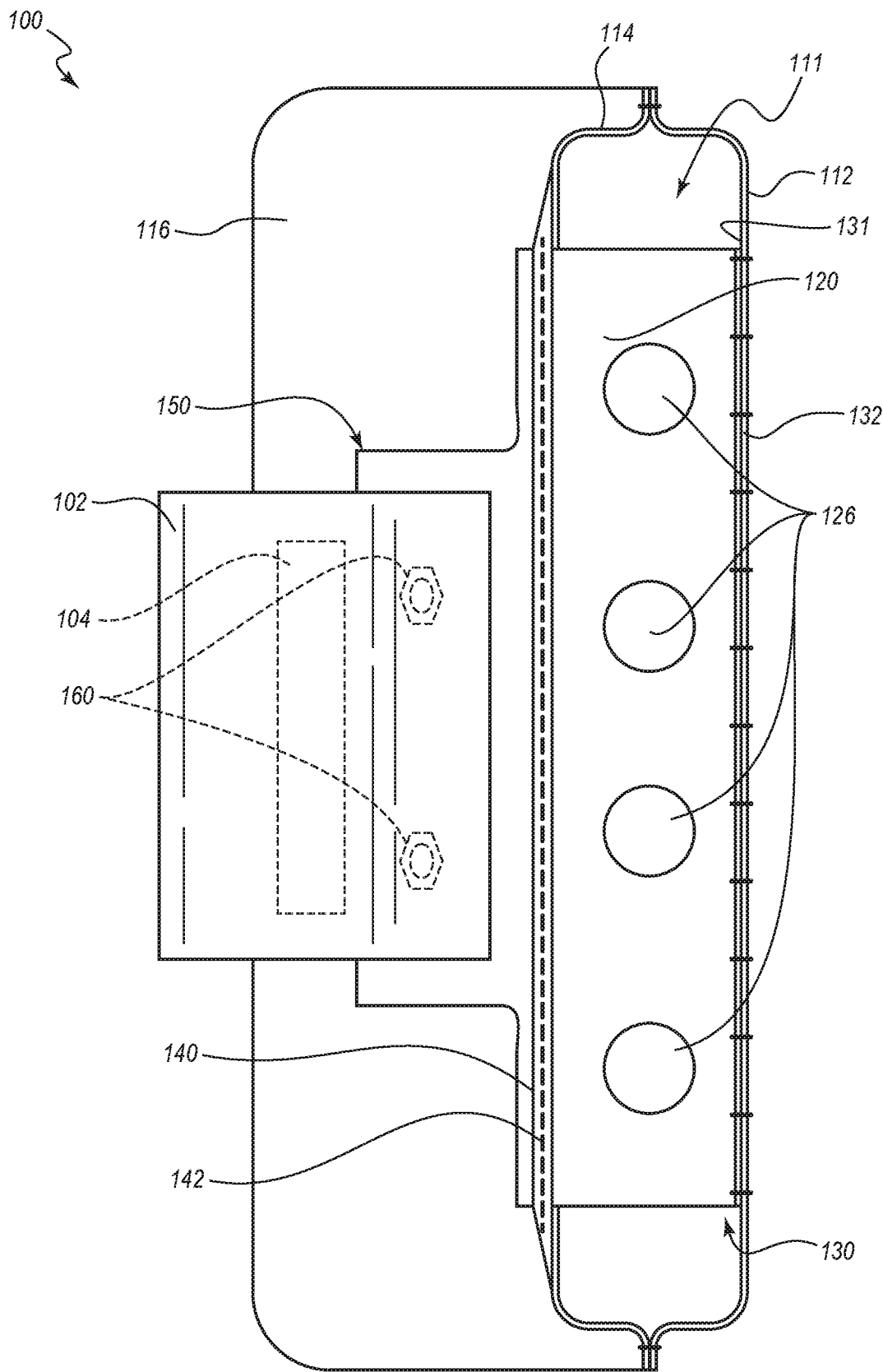
FIG. 3 is a cross-sectional view of the knee airbag assembly of FIG. 1A, with the airbag cushion in a deployed and inflated state.
Figure 4A:
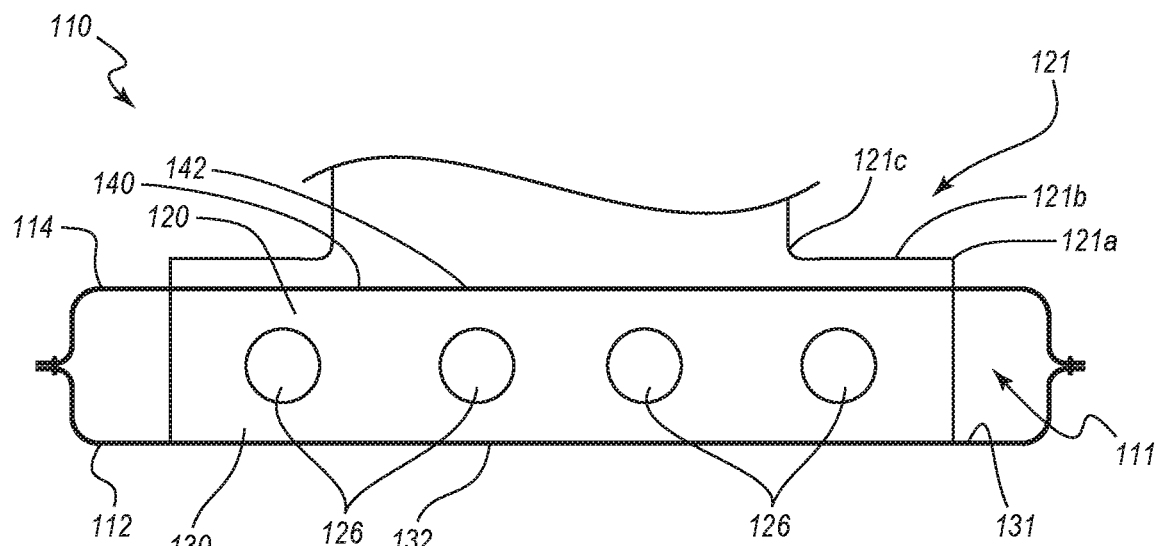
FIG. 4A is a partial cross-sectional view from a position upward and rearward of the airbag cushion of the knee airbag assembly of FIG. 1A, the airbag cushion in a deployed and inflated state.
Figure 4B:
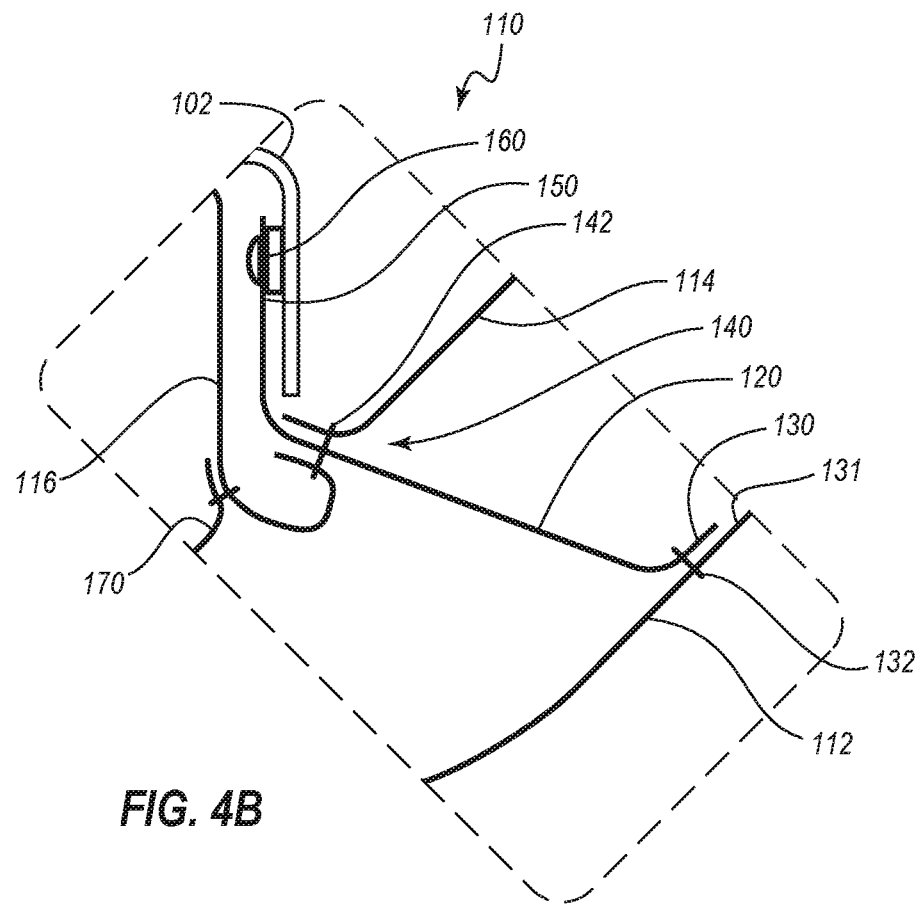
FIG. 4B is a partial cross-sectional view from the side of the airbag cushion of the inflatable knee airbag assembly of FIG. 1A, the airbag cushion in a deployed and inflated state, showing detail of the positional tether of FIG. 4A.

FIG. 2B includes the Section 3-3 orientation for FIG. 3 and the region 4B for detail in FIG. 4B.

FIG. 3 is a cross-sectional view of the knee airbag assembly 100 of FIG. 1A, with the airbag cushion 110 in a deployed and inflated state. The point of view for the cross section in FIG. 3. is shown in FIG. 2B (see, e.g., 3-3 in FIG. 2B). The airbag cushion 110 includes the occupant-facing panel 112, the vehicle-facing panel 114, and the throat panel 116. The positional tether 120 is shown. The positional tether 120 includes the first end 130 and the second end 150. The first end 130 couples to an interior surface 131 of the occupant-facing panel 112 at a distal interface 132. The positional tether 120 extends through the inflatable chamber 111 of the airbag cushion 110 and passes through the vehicle-facing panel 114 via the transition port 140. The positional tether 120 extends from the transition port 140 and couples to the housing 102 at the second end 150 at the anchor point(s) 160. The positional tether 120 couples to the transition port 140 at the transition interface 142. In other words, the throat panel 116, the vehicle-facing panel 114, and the positional tether 120 couple together at the transition interface 142, and the transition interface 142 is at least part of the transition port 140. The transition interface 142 and/or the transition port 140 serve to permit the positional tether 120 to transition from the interior of the airbag cushion 110 to the exterior of the airbag cushion 110 (in order to couple to the housing 102) while forming a nominally airtight seal. Because the positional tether 120 passes through the inflatable chamber 111 of the airbag cushion 110, the positional tether 120 may include at least one vent 126 to ensure the fluid communication of inflation gases throughout the airbag cushion 110.

In the embodiment of FIG. 3, the second end 150 of the positional tether 120 couples to an interior portion of the housing 102 at two anchor points 160. In another embodiment, the second end 150 of the positional tether 120 may couple to the housing 102 at a single anchor point 160. In still another embodiment, the second end 150 of the positional tether 120 may couple to the housing 102 at more than two anchor points 160.

FIG. 4A is a partial cross-sectional view from a position upward and rearward of the airbag cushion 110 of the knee airbag assembly 100 of FIG. 1A. The view angle is shown as 3-3 in FIG. 2B. The airbag cushion 110 is in a deployed and inflated state. In the embodiment shown in FIG. 4A, the positional tether 120 is a single panel constructed of an appropriate material. The positional tether 120 couples at the first end 130 to the interior surface 131 of the occupant-facing panel 112 at the distal interface 132. The positional tether 120 extends through the inflatable chamber 111 of the airbag cushion 110 to the transition port 140 and passes through the transition port 140. The positional tether 120 extends from the transition port 140 to the anchor point (not shown, but see, e.g., 160 in FIG. 4B). The second end (not shown, but see, e.g., 150 in FIG. 4B) of the positional tether 120 couples to the housing (not shown, but see, e.g., 102 in FIG. 4B) at the anchor point.

The first end 130 of the positional tether 120 couples to the interior surface 131 of the occupant-facing panel 112 at the distal interface 132 via a seam or any other appropriate coupling method. The positional tether 120 couples to the transition port 140 at the transition interface 142 via a seam or any other appropriate coupling method.

The positional tether 120 may include one or more vents 126 to provide for fluid communication of inflation gases throughout the inflatable chamber 111 of the airbag cushion 110. The vent(s) 126 may be of any size, shape, number, or configuration to permit the fluid communication of inflation gases throughout the inflatable chamber 111 while still providing the function(s) of the present disclosure. The positional tether 120 may be formed of a single piece of fabric. In other embodiments, the tether 120 may be formed of multiple pieces of fabric. That portion of the positional tether 120 which extends from the transition port 140 toward the anchor point(s) (not shown, but see, e.g., 160 in FIG. 3) may have a lateral width of any suitable dimension, such as the width of the housing (not shown, but see, e.g., 102 in FIG. 3), or the full width of the airbag cushion 110 or positional tether 120, or any other suitable dimension.

The positional tether 120 has an edge profile 121 on either lateral side nominally demarcating the shape of the positional tether 120. More specifically, as shown in FIG. 4A, the edge profile 121 includes a distal corner 121a, a medial portion 121b, and a proximal corner 121c. The distal corner 121a is here shown as 90° (right-) angle, while the medial portion 121b is shown as a straight-line segment and the proximal corner 121c is shown as a quarter-circle curve. The edge profile 121 may assume any shape appropriate for a method of construction, anchoring, packaging, and/or deployment. In other words, the right-angle of the distal corner 121a may be a different shape, the medial portion 121b may be straight or curved, and the proximal corner 121c may be other than a quarter-circle curve. The edge profile 121 may be a single straight line segment, a single curve, or any combination of straight-line segments and/or curves appropriate to a method of construction, anchoring, packaging, and/or deployment.

FIG. 4B is a cross-sectional view of a detail region from the side of the airbag cushion 110 of the inflatable knee airbag assembly 100 of FIG. 1A. The airbag cushion 110 is in a deployed and inflated state, showing detail of the positional tether 120 of FIG. 4A. The detail region shown in FIG. 4B is shown and designated as 4B in FIG. 2B. In the embodiment of FIG. 4B, the positional tether 120 is a single piece of appropriate material or fabric. The side view of FIG. 4B illustrates that, in at least one embodiment, the first end 130 of the positional tether 120 can couple at the distal interface 132 to the interior surface 131 of the occupant-facing panel 112. FIG. 4B also shows the positional tether 120 passing through the transition port 140 and coupling to the vehicle-facing panel 114 and the throat panel 116 at the transition interface 142. The positional tether 120 then couples at the second end 150 at the anchor point(s) 160 to the housing 102.

As noted elsewhere herein, the airbag cushion 110 may include at least one section panel 170. One or more such section panel(s) 170 may be located forward (relative to the vehicle) of the transition port 140 as shown. Other section panels 170 may be disposed more toward a distal end of the airbag cushion 110 in a deployed state.

Figure 5A:
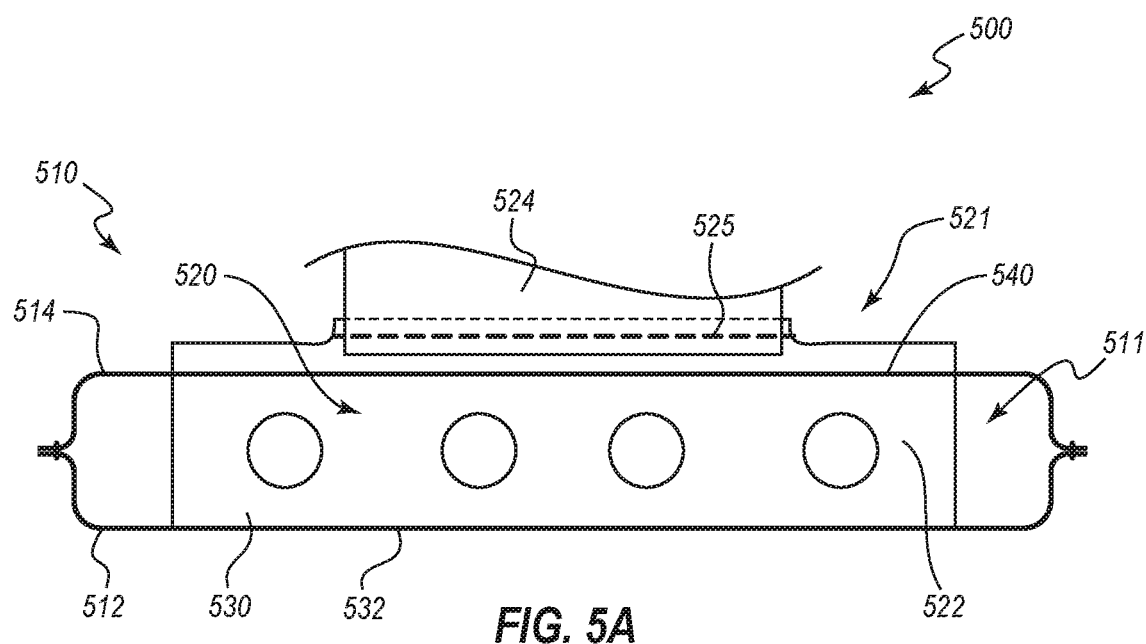
FIG. 5A is a partial cross-sectional view from a position upward and rearward of an airbag cushion similar to the airbag cushion of the inflatable airbag assembly of FIGS. 1A-4B, the airbag cushion deployed and inflated, and showing an embodiment of the positional tether.

FIG. 5A depicts a cross-sectional view of an airbag cushion 510 of an embodiment of a knee airbag assembly 500 that resembles the knee airbag assembly 100 described above in certain respects. Accordingly, like features are designated with like reference numerals, with the leading digits incremented to "5," for example, the airbag cushion 510 that may, in some respects, resemble the airbag cushion 110 of FIGS. 1A-4B. Relevant disclosure set forth above regarding similarly identified features thus may not be repeated hereafter. Moreover, specific features of the knee airbag assembly 100 and related components shown in FIGS. 1A-4B may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the knee airbag assembly and related components depicted in FIG. 5A. Any suitable combination of the features, and variations of the same, described with respect to the knee airbag assembly 100 and related components illustrated in FIGS. 1A-4B can be employed with the knee airbag assembly 500 and related components of FIG. 5A, and vice versa. This pattern of disclosure applies equally to further embodiments depicted in subsequent figures and described hereafter, wherein the leading digits may be further incremented.

FIG. 5A is a cross-sectional view from a position upward and rearward of an embodiment of an airbag cushion 510 (view angle is shown as 3-3 in FIG. 2B) that resembles the airbag cushion 110 of the inflatable knee airbag assembly 100 of FIGS. 1A-4B. In FIG. 5A, the airbag cushion 510 is deployed and inflated, and showing an embodiment of a positional tether 520. In this embodiment, the positional tether 520 includes two separate and distinct segments 522, 524. The first segment 522 of the positional tether 520 couples at a first end 530 at a distal interface 532 to an interior surface of an occupant-facing panel 512. The first segment 522 of the positional tether 520 then passes through an inflatable chamber 511 of the airbag cushion 510 to a transition port 540. At or near the transition port 540, the first segment 522 of the positional tether 520 couples to the second segment 524 of the positional tether 520 at a segment coupling 525. In at least one embodiment, the segment coupling 525 is co-located with, or incorporated in, the transition port 540. In another embodiment, the first segment 522 may couple to the second segment 524 at the segment coupling 525 at a point external to and displaced from the airbag cushion 510 and forward (relative to the vehicle) of the transition port 540. The second segment 524 of the positional tether 520 then couples at the second end (not shown, but see, e.g., 550 in FIG. 5B) to the housing (not shown, but see, e.g., 502 in FIG. 5B) at the anchor point(s) (not shown, but see, e.g., 560 in FIG. 5B).

The positional tether 520 includes an edge profile 521. The various components of the edge profile 521 (not shown, but see, e.g., 121a, 121b, and 121c in FIG. 4A) may be part of either the first segment 522 or the second segment 524 as appropriate to the method of construction, anchoring, compaction, and/or deployment.

Figure 5B:
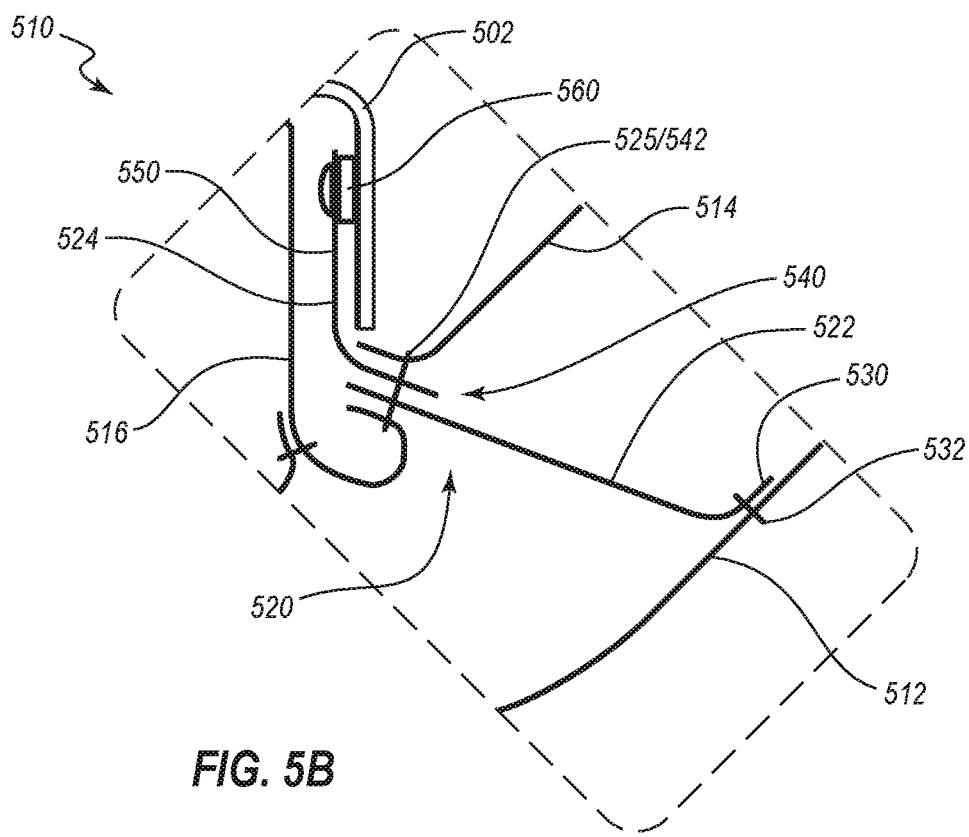
FIG. 5B is a partial cross-sectional view from a side of the airbag cushion of FIG. 5A, the airbag cushion deployed and inflated and showing detail of the positional tether of FIG. 5A.

FIG. 5B is a cross-sectional view of a detail region from a side of the airbag cushion 510 of FIG. 5A, the airbag cushion 510 deployed and inflated and showing detail of the positional tether 520 of FIG. 5A (a location of the detail region is shown as 4B in FIG. 2B). The first end 530 of the positional tether 520 is part of the first segment 522. A second end 550 of the positional tether 520 is part of the second segment 524. In the embodiment of FIG. 5B, the first segment 522 couples with the second segment 524 at the segment coupling 525. The segment coupling 525 is shown co-located with, and may be integral to, a transition interface 542. The transition interface 542 is part of the transition port 540. The second segment 524 couples at the second end 550 to the housing 502 at the anchor point(s) 560. In the embodiment of FIG. 5B, a layering order of the materials (ends of panels 514, 516 and segments 522, 524) which couple at the transition interface 542 and/or segment coupling 525, considered from top to bottom is, first, the end of the vehicle-facing panel 514; second, the end of the second segment 524; third, the end of the first segment 522; and fourth, the end of the throat panel 516. As shown elsewhere in this disclosure, this layering order may vary from one embodiment to another.

Figure 5C:
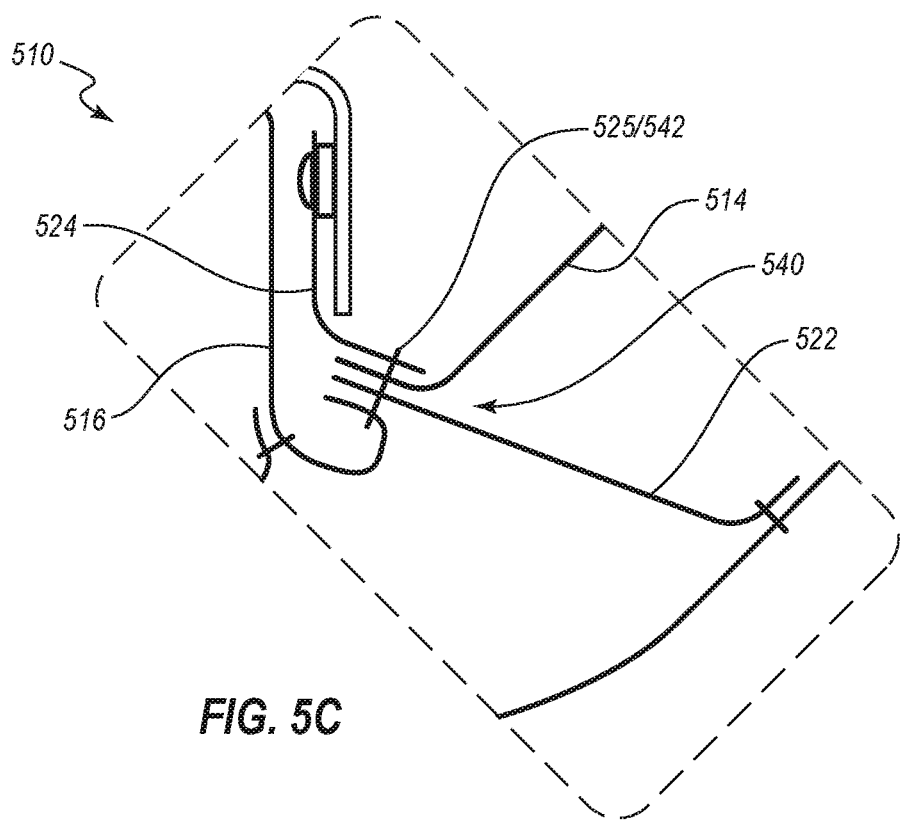
FIG. 5C is another embodiment, specifically, of the transition port and segment coupling of the airbag cushion of FIGS. 5A and 5B.

FIG. 5C is another cross-sectional view of a detail region, specifically, of the transition port 540 and/or segment coupling 525 of the airbag cushion 510 of FIGS. 5A and 5B. In this embodiment, the layering order of the materials (ends of panels 514, 516 and segments 522, 524) which couple at the transition interface 542 and/or segment coupling 525 (co-located at the transition port 540), considered from top to bottom is, first, the end of the second segment 524; second, the end of vehicle-facing panel 514; third, the end of the first segment 522; and fourth, the end of the throat panel 516.

While FIGS. 5B and 5C illustrate two specific layer orders for coupling components at the transition interface 542 and/or segment coupling 525, these are by way of example, and other layer orders may be possible to achieve the same basic structure, and are contemplated by the present disclosure.

Figure 5D:
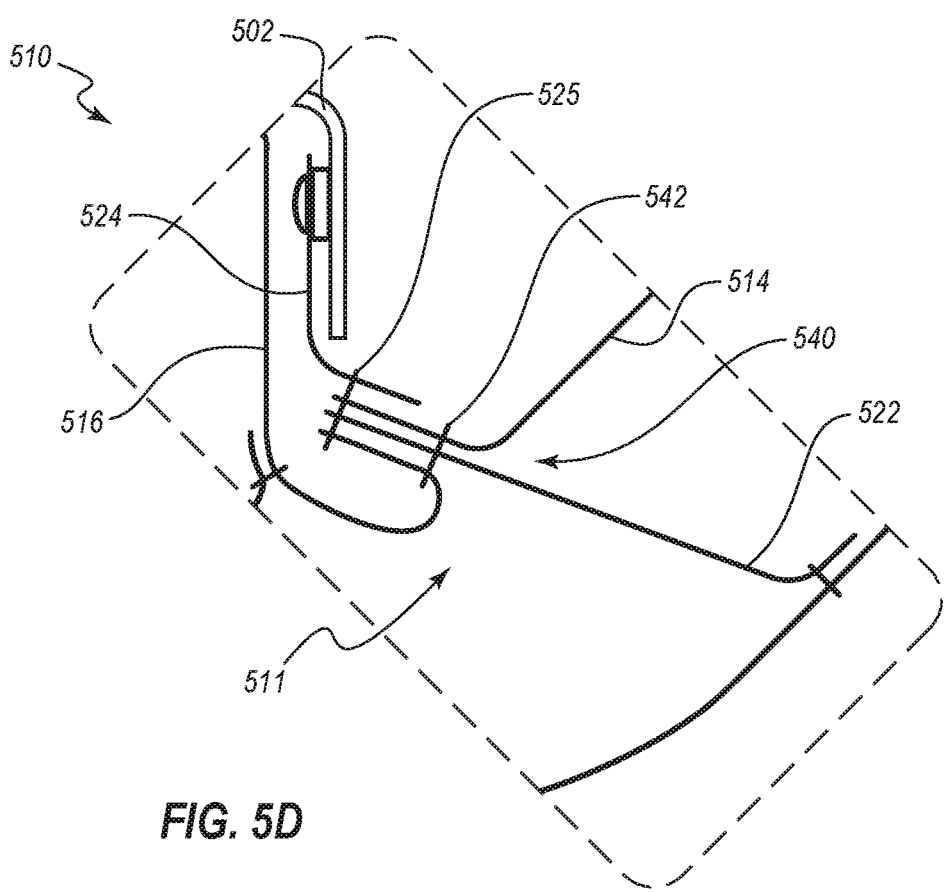
FIG. 5D is another embodiment, specifically, of the transition port and segment coupling similar to that of the airbag cushion of FIG. 5A.

FIG. 5D is another cross-sectional view of a detail region, specifically, of the transition port 540 and/or segment coupling 525 similar to that of the airbag cushion 510 of FIG. 5A. In this embodiment of FIG. 5D, the segment coupling 525 is distinct from the transition interface 542, and also distinct from the transition port 540. The transition interface 542 is co-located with, and part of, the transition port 540. The segment coupling 525 is located forward of the transition interface 542. In other words, the segment coupling 525 is nearer to the housing 502 than is the transition interface 542 and/or transition port 540. The segment coupling 525 includes, in this order from top to bottom, an end of the second segment 524, an end of the vehicle-facing panel 514, an end of the first segment 522, and an end of the throat panel 516. Other layer orders are possible and are contemplated by this disclosure In some embodiments, the segment coupling 525 may include only, in either order, an end of the second segment 524 and an end of the first segment 522. In other words, in some embodiments, only the two segments 524, 522 may couple at the segment coupling 525, while the first segment 522 may couple to the vehicle-facing panel 514 and the throat panel 516 at the transition interface 542 of the transition port 540. In yet other embodiments, the two segments 524, 522 may couple at a segment coupling 525 within the inflatable chamber 511 of the airbag cushion 510 (that is, more distal to the housing 502 than the transition port 540) such that the second segment 524 couples at the transition interface 542.

Figure 6A:
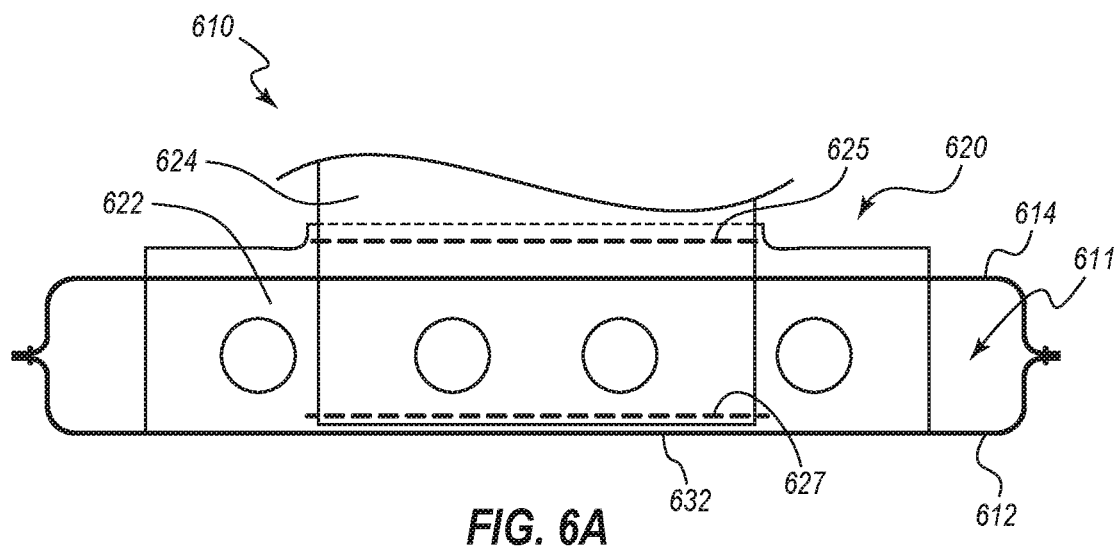
FIG. 6A is a partial cross-sectional view from a position upward and rearward of an airbag cushion similar to the airbag cushion of the inflatable airbag assembly of FIGS. 1A-4B, the airbag cushion deployed and inflated, and showing an embodiment of the positional tether.

FIG. 6A is a cross-sectional view from a position upward and rearward of an embodiment of an airbag cushion 610 that resembles the airbag cushion of the inflatable knee airbag assembly 100 of FIGS. 1A-4B, the airbag cushion 610 deployed and inflated, and showing another embodiment of a positional tether 620. In the current embodiment, the positional tether 620 includes a first segment 622 and a second segment 624. The first segment 622 couples to the second segment 624 at a proximal segment coupling 625 and at a distal segment coupling 627. In some embodiments, the segment couplings 625, 627 may either or both be seams, or either or both may be formed by any other suitable method. In yet other embodiments, the two segments 622, 624 may be coupled by any appropriate method of attachment commencing at the proximal segment coupling 625 and continuing to the distal segment coupling 627.

The first segment 622 couples at a distal interface 632 to an occupant-facing panel 612. The first segment 622 and second segment 624 travel through an inflatable chamber 611 of the airbag cushion 610, then pass through the transition port (not shown, but see, e.g., 640 in FIG. 6B) and continue to the proximal segment coupling 625. The second segment 624 then continues to and couples to the housing (not shown, but see, e.g., 602 in FIG. 6B) at the anchor point(s) (not shown, but see, e.g., 660 in FIG. 6B).

Figure 6B:
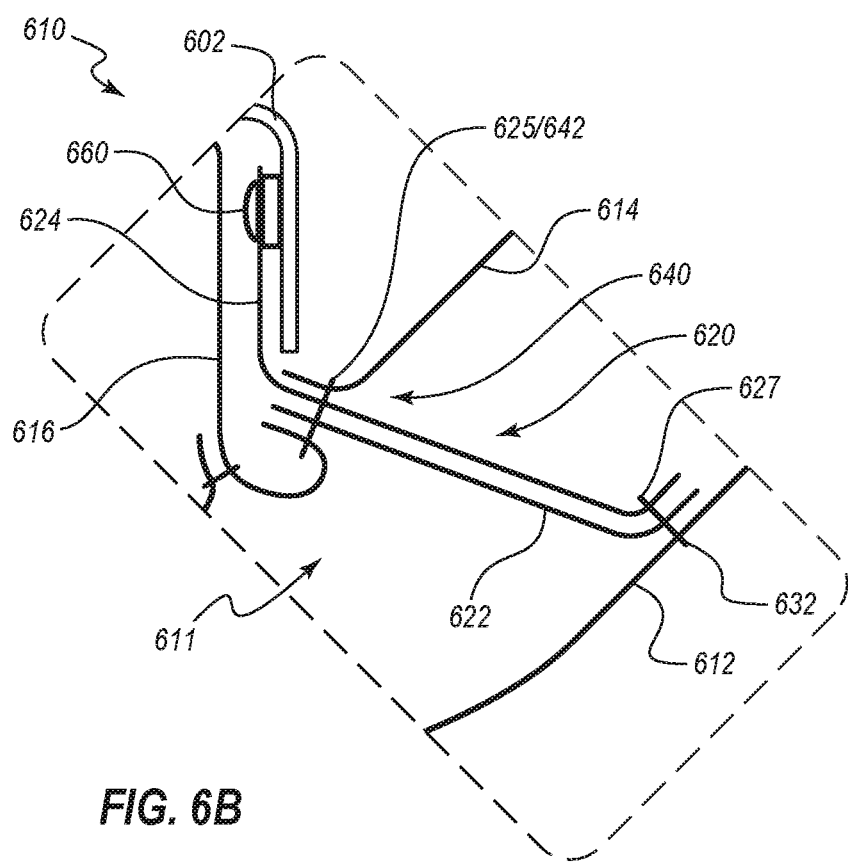
FIG. 6B is a partial cross-sectional view from a side of the airbag cushion of FIG. 6A, the airbag cushion deployed and inflated and showing detail of the positional tether of FIG. 6A.

FIG. 6B is a cross-sectional view of a detail region from a side of the airbag cushion 610 of FIG. 6A. The airbag cushion 610 is deployed and inflated and showing detail of the positional tether 620 of FIG. 6A. The positional tether 620 includes a first segment 622 and a second segment 624. The first segment 622 of the positional tether 620 couples to the second segment 624 of the positional tether 620 at the distal segment coupling 627 and at the proximal segment coupling 625. In some embodiments, the distal segment coupling 627 may be co-located with and incorporate the distal interface 632. In other embodiments, the distal segment coupling 627 may be proximally located from the distal interface 632. In other words, the distal segment coupling 627 may be near but distinct from the distal interface 632. The proximal segment coupling 625 may be co-located with and incorporate a transition interface 642. In other embodiments, the proximal segment coupling 625 may be distinct from the transition interface 642 and located near and proximally (to a housing 602) from the transition interface 642.

In the embodiment of FIG. 6B, the layering order of the materials which couple at the transition interface 642/segment coupling 625, considered from top to bottom is, first, the end of the vehicle-facing panel 614; second, the second segment 624 of the positional tether 620; third, the proximal end of the first segment 622 of the positional tether 620; and fourth, the end of a throat panel 616. The layering order may vary from one embodiment to another, and such alternative layering order is contemplated by this disclosure.

Figure 7A:
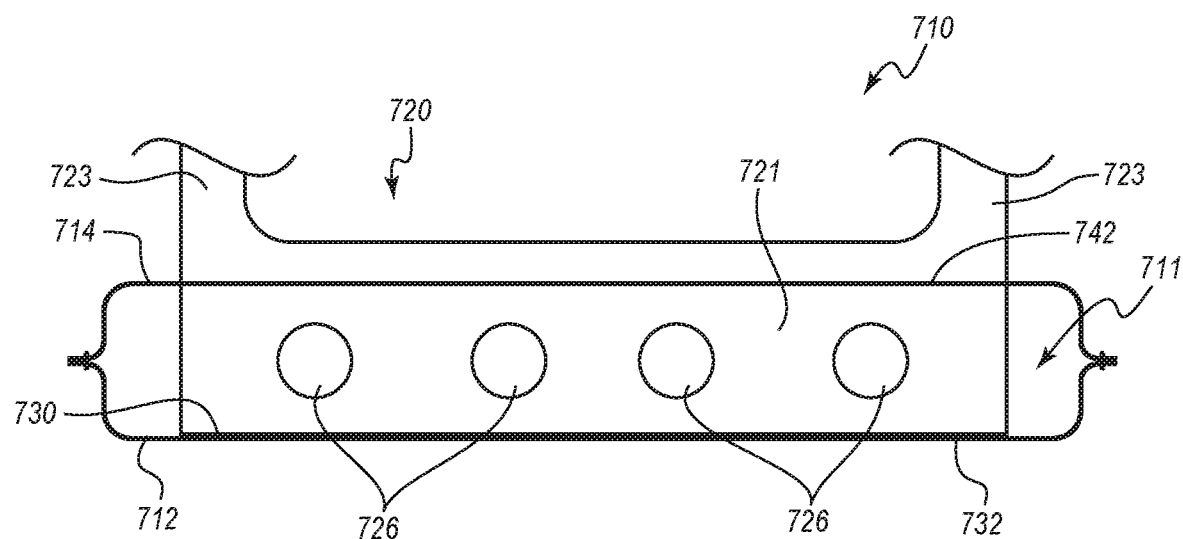
FIG. 7A is a partial cross-sectional view of an airbag cushion similar to the airbag cushion of FIGS. 1A-4B, and similar to the airbag cushions of FIGS. 5A-6B, the airbag cushion deployed and inflated, and showing a particular profile of the positional tether.

FIG. 7A is a cross-sectional view of an airbag cushion 710 similar to the airbag cushion 110 of FIGS. 1A-4B. The airbag cushion 710 is deployed and inflated. A profile of a positional tether 720 can be seen in FIG. 7A. An occupant-facing panel 712 and a vehicle-facing panel 714 are shown for reference. The angle of view is the same as that in FIG. 3 (see, e.g., 3-3 in FIG. 2B). The positional tether 720 couples to the occupant-facing panel 712 at a distal interface 732. The positional tether 720 couples to the vehicle-facing panel 714 at a transition interface 742. The positional tether 720 couples to the housing (not shown, but see, e.g., 102 in FIG. 2B) at the anchor point(s) (not shown, but see, e.g., 160 in FIG. 2B).

In the embodiment of FIG. 7A, the positional tether 720 includes a main section 721 and two anchor sections 723. (Compare to the positional tether 120 in FIG. 4A.) The main section 721 of the positional tether 720 is, generally, that portion of the positional tether 720 commencing at a first end 730 of the positional tether 720 at or near the distal interface 732 and extending to the transition interface 742. In other words, the main section 721 of the positional tether 720 is that portion of the positional tether 720 within an inflatable chamber 711 of the airbag cushion 710. The main section 721 of the positional tether 720 may include at least one vent 726 in order to facilitate fluid communication of inflation gases within the airbag cushion 710.

In the embodiment of FIG. 7A, the anchor sections 723 of the positional tether 720 are located at either lateral end of the positional tether 720 and extend from the main section 721 of the positional tether 720 to the anchor points (not shown, but see, e.g., 160 in FIG. 2B). The lateral width of either anchor section 723 may be any suitable dimension.

Figure 7B:
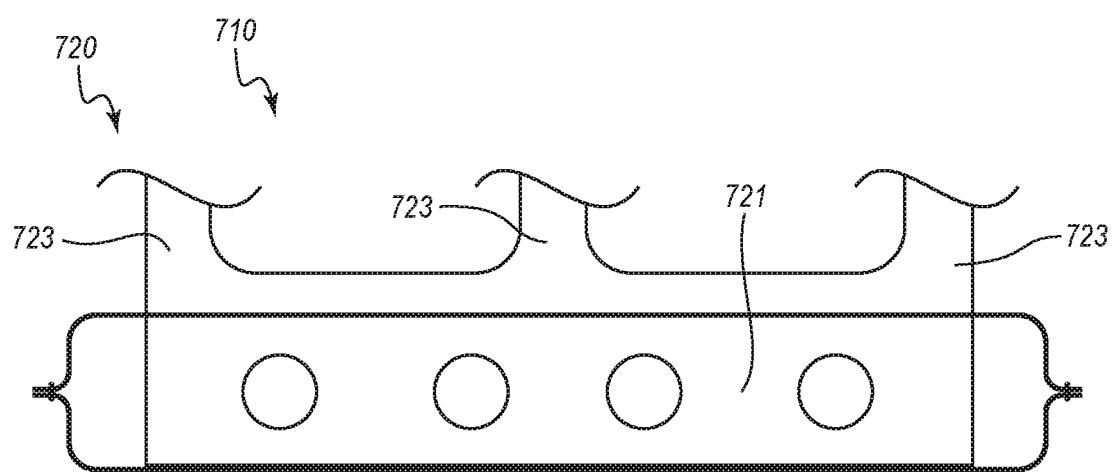
FIG. 7B is a partial cross-sectional view of the airbag cushion of FIG. 7A, the airbag cushion deployed and inflated, showing another embodiment of the profile of the positional tether.

FIG. 7B is a cross-sectional view of the airbag cushion 710 of FIG. 7A, showing another embodiment of a profile of the positional tether 720. In the illustrated embodiment of FIG. 7B, the positional tether 720 includes the main section 721 and three anchor sections 723. Two of the anchor sections 723 may be located at either lateral end of the positional tether 720, similar to the embodiment shown in FIG. 7A. The third anchor section 723 may be located at or near a lateral center of the positional tether 720.

The present disclosure anticipates yet other embodiments including more than three anchor sections 723 having an anchor section 723 located at either lateral edge of the positional tether 720 and other anchor sections 723 situated between the lateral edge anchor sections 723.

Figure 7C:
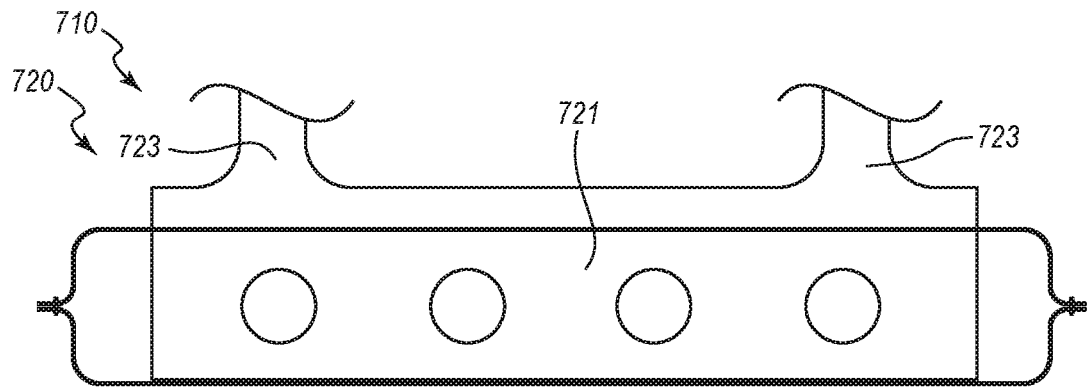
FIG. 7C is a partial cross-sectional view of the airbag cushion of FIG. 7A, the airbag cushion deployed and inflated, showing another embodiment of the profile of the positional tether.

FIG. 7C is a cross-sectional view of the airbag cushion 710 of FIG. 7A showing another embodiment of a profile of the positional tether 720. In the embodiment of FIG. 7C, the positional tether 720 includes the main section 721 and two anchor sections 723. The two anchor sections 723 may be located a suitable distance from either lateral edge of the positional tether 720. The present disclosure anticipates embodiments in which there may be more than two anchor sections 723.

Figure 7D:
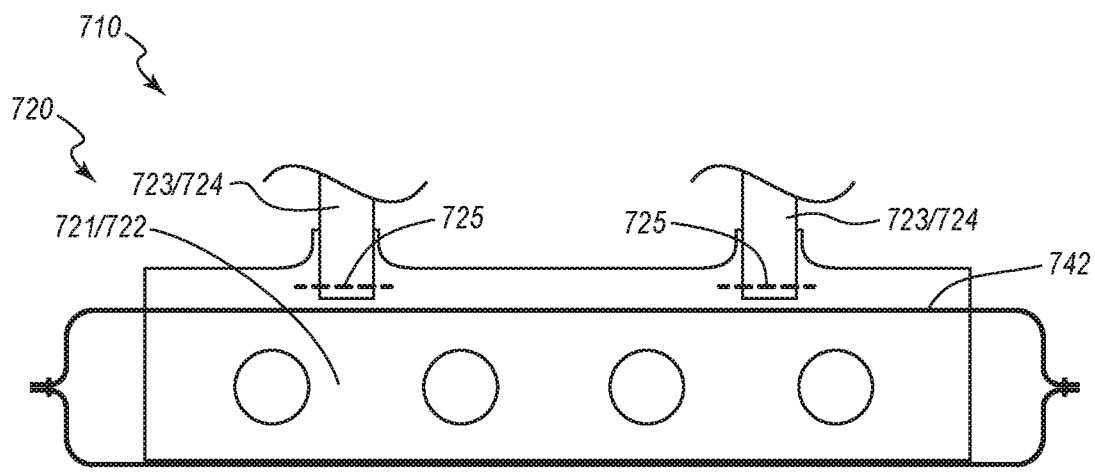
FIG. 7D is a partial cross-sectional view of the airbag cushion of FIG. 7A, the airbag cushion deployed and inflated, showing variations on the embodiments of FIGS. 7A and 7B.

FIG. 7D is a cross-sectional view of the airbag cushion 710 of FIG. 7A, showing variations on the embodiments of FIGS. 7A and 7B. The main section 721 and the anchor sections 723 may be distinct panels. In embodiments in which the main section 721 and anchor sections 723 are distinct from each other, the main section 721 may be a first segment 722 of the positional tether 720 while the anchor sections 723 may serve as a second segment(s) 724 (compare to the first and second segments 522, 524 of FIG. 5A). In embodiments where the main section 721 is distinct from the anchor sections 723, the main section 721 may couple to the anchor sections 723 at the transition interface 742 or at a proximal segment coupling 725.

Figure 7E:
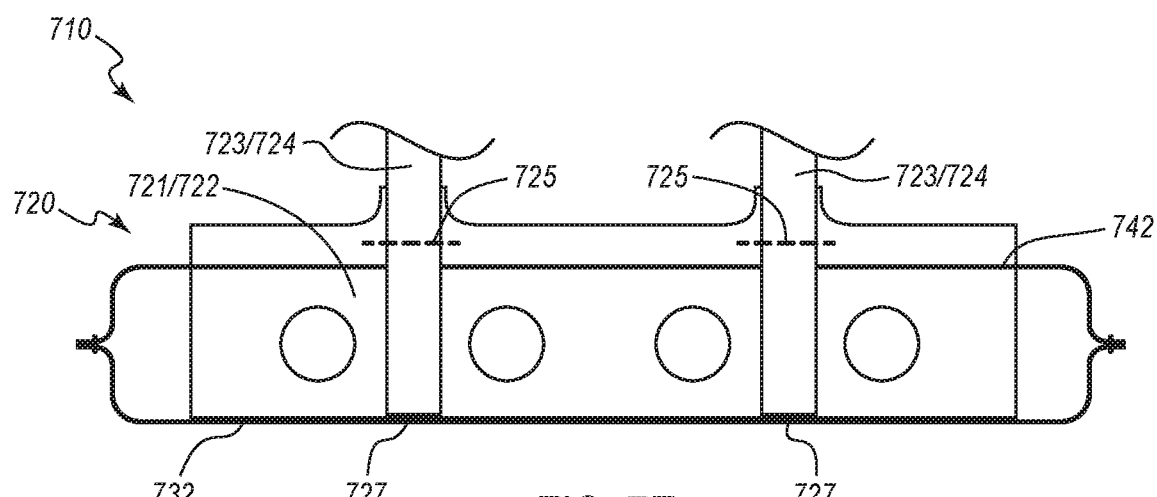
FIG. 7E is a partial cross-sectional view of the airbag cushion of FIG. 7A, the airbag cushion deployed and inflated, showing variations on the embodiments of FIGS. 7A and 7B, and similar to the embodiments of FIG. 7D.

FIG. 7E is a cross-sectional view of the airbag cushion 710 of FIG. 7A, showing variations on the embodiments of FIGS. 7A and 7B, and similar to the embodiments of FIG. 7D. In the present embodiment, the main section 721 may be the first segment 722 of the positional tether 720 while the anchor sections 723 may serve as the second segment(s) 724 (compare to the first and second segments 622, 624 of FIG. 6A). The anchor sections 723 may couple to the main section 721 at the distal interface 732 or a distal segment coupling 727 (similar to the positional tether 620 in FIG. 6A). The anchor section 723 may then couple to the main section 721 a second time at the transition interface 742 or at the proximal coupling 725.

Figure 8A:
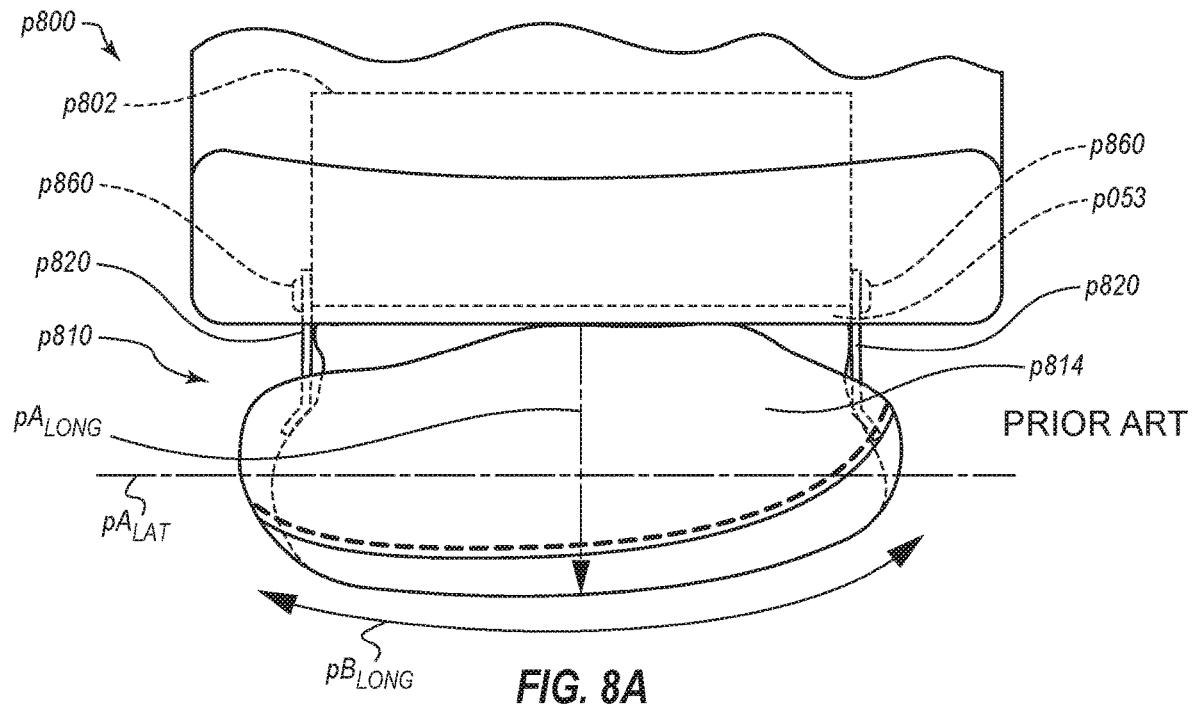
FIG. 8A is a partial view of a prior art embodiment of an inflatable knee airbag assembly from an upward and rearward angle, the airbag cushion deploying and partially inflated.
Figure 8B:
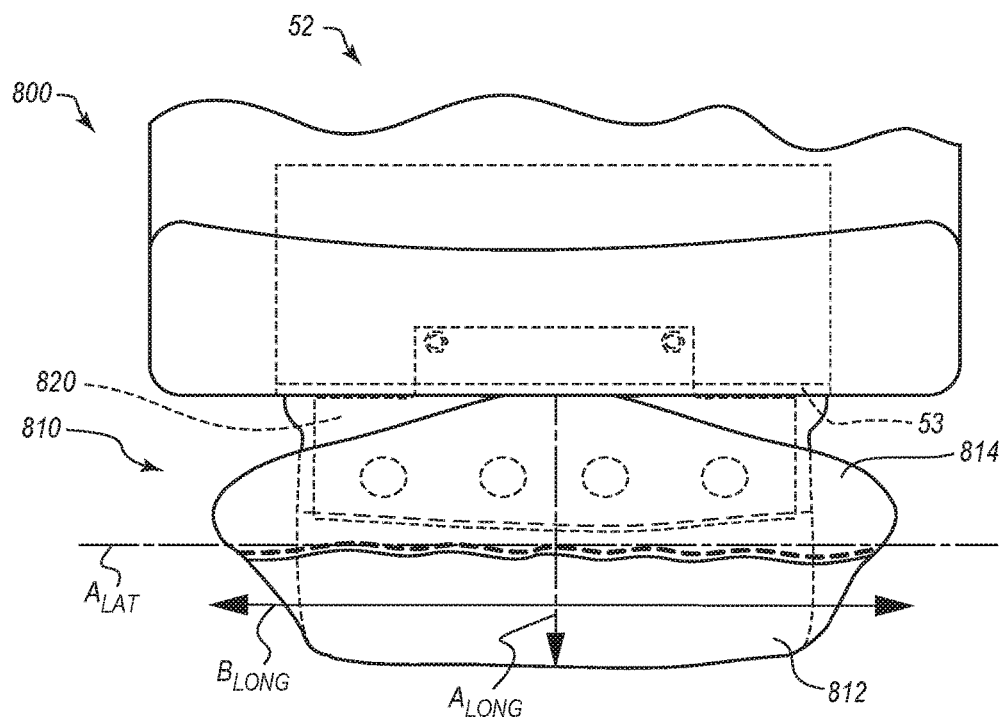
FIG. 8B is a partial view of an inflatable knee airbag assembly according to the disclosures herein from an upward and rearward angle, the airbag cushion deploying and partially inflated.

FIGS. 8A and 8B present for comparison purposes a prior art embodiment of an inflatable knee airbag assembly prior to the embodiments of this disclosure but otherwise similar to the inflatable knee airbag assembly 100 of FIGS. 1A through 7E, and 10.

FIG. 8A is a partial view of a prior art embodiment of an inflatable knee airbag assembly p800, with an airbag cushion p810 deploying and partially inflated. The inflatable knee airbag assembly p800 is shown installed to a lower instrument panel p052 of a vehicle. Knee airbag assembly installations inherently include a gap p053 between a housing p802 and the lower instrument panel p052. The airbag cushion p810 is shown a moment after deployment has been initiated. The airbag cushion p810 has at least partially deployed from the housing p802 and is being inflated by action of an inflator (not shown). The airbag cushion p810 is coupled at its lateral edges to a pair of restraining tethers p820. The restraining tethers p820, in turn, couple to the housing p802.

Because the housing p802 is oriented to initially deploy the airbag cushion p810 downward relative to the vehicle, the airbag cushion p810 initially deploys downward. Through a combination of folds/pleats (not shown) and internal tethers (not shown) and the restraining tethers p820, the airbag p810 is forced to turn upward to extend in an upward and rearward direction relative to the vehicle. As the airbag cushion p810 begins inflating, the force of the inflation gases within the airbag cushion p810, combined with the restraining tethers p820 coupled to the airbag cushion p810 at the lateral edges of the airbag cushion p810, the airbag cushion p810 tends to deform rearward to form a rearward bulge or a rearward bowing $pB_{LONG}$. The rearward bowing $pB_{LONG}$ results in a significantly rearward extension of the airbag cushion p810 along a longitudinal axis $PA_{LONG}$. The lateral axis $pA_{LAT}$ is also shown as a reference point to visualize rearward bowing $pB_{LONG}$.

Absent some mechanism to assist an airbag cushion (such as p810) to clear the gap p053 before turning upward while turning rearward, the airbag cushion p810 may engage the gap p053 and become partially lodged in or against the gap p053. This "catching" of the airbag cushion p810 on the gap p053 may prevent the airbag cushion p810 from properly turning rearward and upward or from otherwise properly deploying. In instances that the airbag cushion p810 does not successfully deploy rearward of the gap p053, the airbag cushion p810 cannot expand sufficiently to accommodate the inflation gases, potentially resulting in a rupture of the airbag cushion p810. The rearward bowing $pB_{LONG}$ may permit the airbag cushion p810 to prematurely engage the lower legs of the occupant. Premature engagement of the airbag cushion p810 with the lower legs, perhaps between the legs, may cause the airbag cushion p810 to be improperly positioned, which may result in the airbag cushion p810 failing to protect (or reducing the protection for) an occupant. Premature engagement of the airbag cushion p810 with the lower legs may also cause injury to the occupant.

FIG. 8B is a partial view of an inflatable knee airbag assembly 800, according to one embodiment of the present disclosure. The inflatable knee airbag assembly 800 is shown installed to the lower instrument panel 52 of a vehicle (not shown). An airbag cushion 810 has at least partially deployed from a housing 802 and is being inflated by action of an inflator. As the airbag cushion 810 begins to inflate, a positional tether 820 may be drawn taut and thereby aid in influencing a "turn" or "curve" of the airbag cushion 810. More specifically, the positional tether 820 may permit the airbag cushion 810 to deploy in a downward trajectory, then the positional tether 820 may assist in turning or curving the airbag cushion 810 upward while "jumping" the gap 53 without the horizontal bowing along $B_{LONG}$.

The shape of the positional tether 820, along with its coupling at the anchors 860 at a transition port (not shown, but see, e.g., 140 in FIGS. 4A and 4B) and a distal coupling 832, assist in "turning" the airbag cushion 810 from its initial downward trajectory to a rearward and upward trajectory. In doing so, the shape and position of the positional tether 820 assist the airbag cushion 810 to "jump" the gap 53 and to make the turn with little or no rearward longitudinal bowing $B_{LONG}$. (The longitudinal axis $A_{LONG}$ and the lateral axis $A_{LAT}$ are shown for reference.) By limiting or eliminating the rearward longitudinal bowing $B_{LONG}$ (e.g., reducing curvature of the knee airbag outward, bulging away from the housing, in a transverse plane), embodiments disclosed herein may reduce or eliminate a possibility of the airbag cushion 810 prematurely engaging the lower legs (not shown, but see, e.g., 72 in FIGS. 1B and 1C). Stated otherwise, the positional tether 820 is to be drawn taut during deployment of the airbag cushion 810 from the housing and pull or exert a force on an occupant-facing panel 812 in a manner to reduce curvature of the airbag cushion 810 outward away from the housing in a transverse plane (from the perspective of the seating position, or horizontal plane relative to the vehicle), when the inflatable airbag cushion 810 is in an inflated deployed state. Reducing curvature of the knee airbag in the transverse plane can reduce rigidity of the occupant-facing panel at an occupant receiving area of the knee airbag.

While present methods of "turning" the airbag cushion 810 can create stress on the vehicle-facing panel (see p814 in FIG. 8A), the positional tether 820 may transfer much of this stress from the vehicle-facing panel 814 to the occupant-facing panel 812. This re-distribution of the stresses from "turning" the airbag cushion 810 may reduce a failure rate of the airbag cushion 810.

In presently available knee airbag cushions, "pleats" and "bubbles" in the throat area of the cushion are utilized to aid in turning or bending the cushion. The disclosed embodiments of a positional tether can be used with and in addition to these present practices and techniques, or used alone and without these techniques.

Figure 9A:
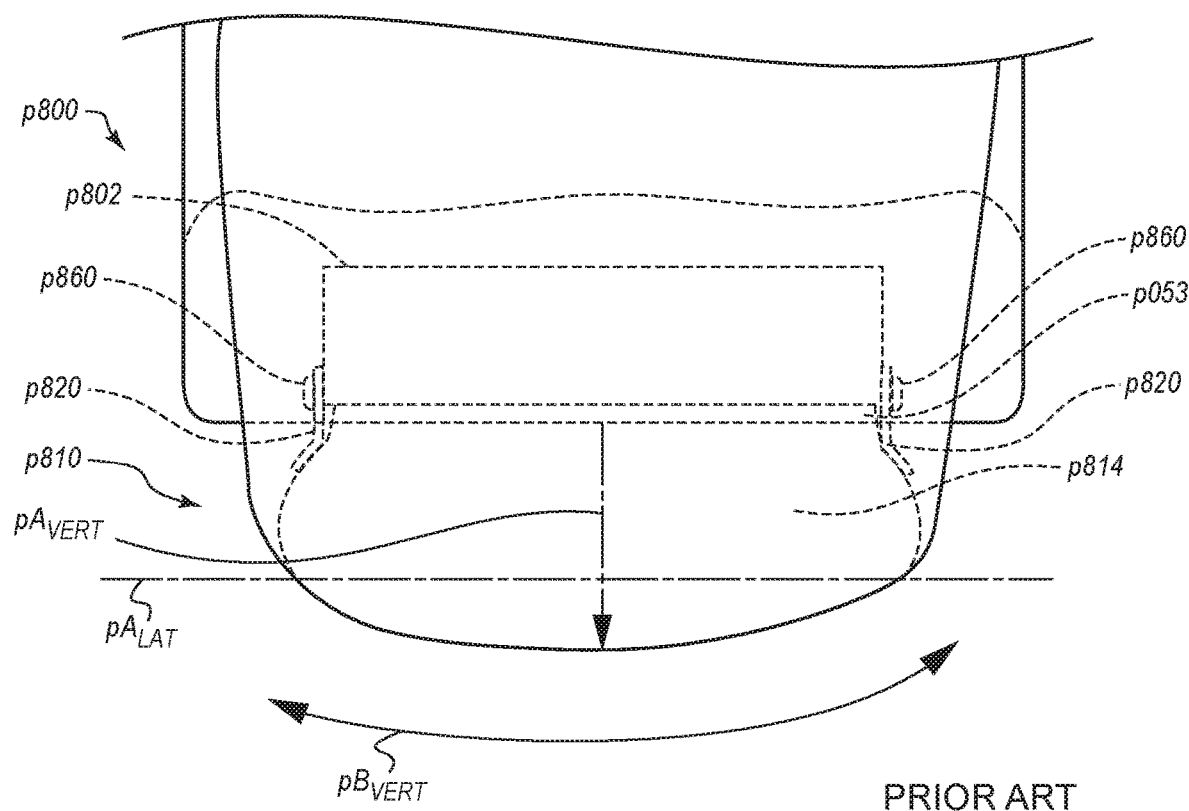
FIG. 9A is a partial rear view of the prior art embodiment of an inflatable knee airbag assembly of FIG. 8A, the airbag cushion deploying and partially inflated.

FIG. 9A is a partial rear view of the prior art embodiment of the inflatable knee airbag assembly p800 of FIG. 8A. The airbag cushion p810 is shown deploying and partially inflated. The view angle of FIG. 9A is from a position directly rear of the knee airbag assembly p800 looking forward along a horizontal (or sagittal) plane. The airbag cushion p810 couples to the anchor tethers p820 at the lateral edges of the airbag cushion p810. The anchor tethers p820 also couple to the housing p802 at anchors p860. The force of the inflation gases inflating the airbag cushion p810, combined with the restraint of the laterally disposed anchor tethers p820, may cause the airbag cushion p810 to deform downward in the vertical plane (relative to the vehicle) and form vertical bowing $pB_{VERT}$. The vertical axis $pA_{VERT}$ and the lateral axis $pA_{LAT}$ are shown for reference. The vertical bowing $pB_{VERT}$ may assist the airbag cushion p810 to "jump" the gap p053. As described above, "jumping" the gap p053 may prevent the airbag cushion p810 from "hanging" on the "gap" and failing to deploy properly or even rupturing. The vertical bowing $pB_{VERT}$ may also cause the airbag cushion p810 to prematurely engage the lower legs (not shown, but see, e.g., 72 in FIG. 1A) of an occupant. Premature engagement of the airbag cushion p810 with the lower legs may cause the airbag cushion p810 to be improperly positioned and therefore fail to protect the occupant, or may even cause injury to the occupant. While the vertical bowing $pB_{VERT}$ may assist the airbag cushion p810 in "jumping" the gap p053, the anchor tethers p820 that accomplish this may induce stresses on the vehicle-facing panel p814, which can result in rupture of the airbag cushion p810 and thereby a loss of protection for the occupant.

Figure 9B:
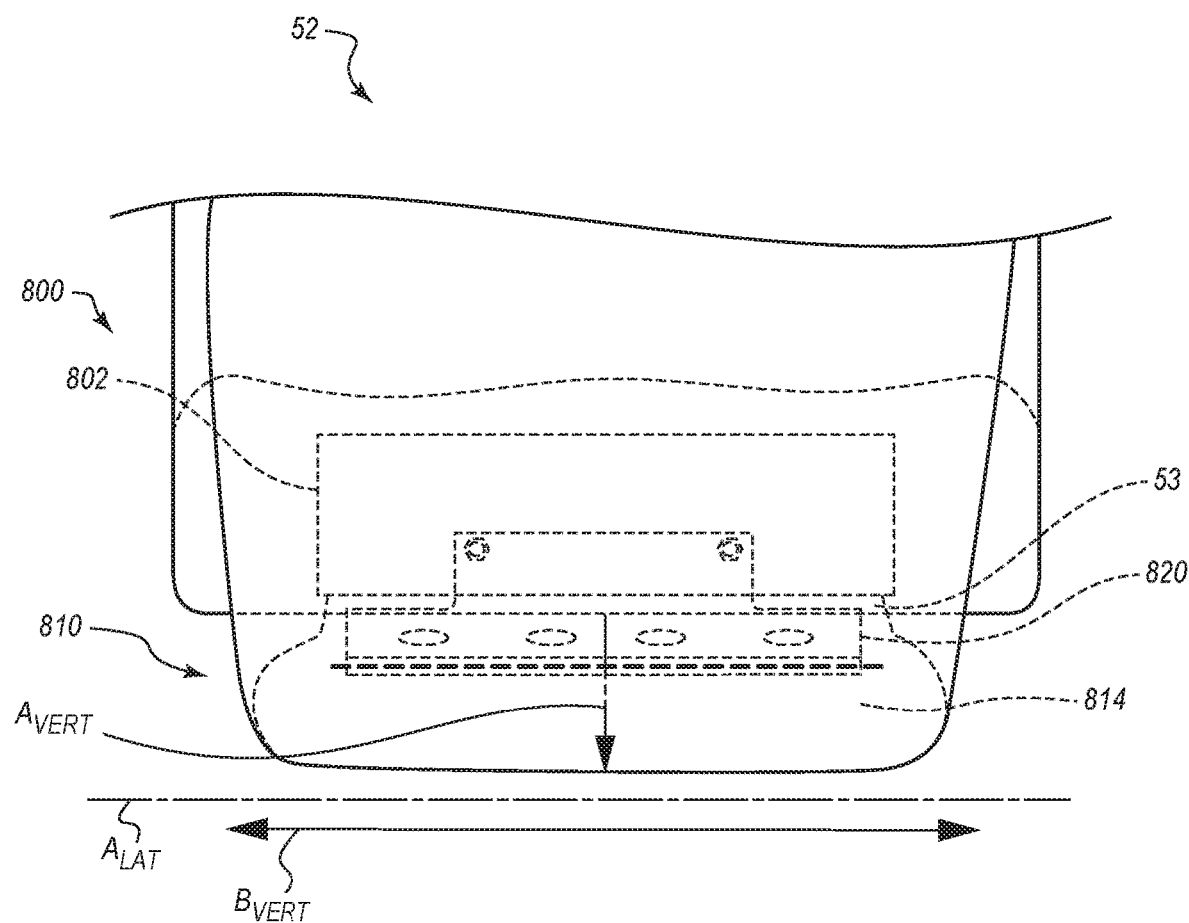
FIG. 9B is a partial rear view of an inflatable knee airbag assembly according to the embodiments of this disclosure, the airbag cushion deploying and partially inflated.

FIG. 9B is a partial rear view of the knee airbag assembly 800 according to the embodiments of this disclosure. The airbag cushion 810 is shown deploying and partially inflated. While FIG. 8A illustrates horizontal bowing ($pB_{LONG}$), FIG. 9A illustrates the same (or related) phenomenon appearing as vertical bowing $pB_{VERT}$. The positional tether 820, by its shape and incorporation to the airbag assembly 800, may assist the airbag cushion 810 to transition or "turn" from its initial downward trajectory rearward and upward while also "jumping" the gap 53 and reducing or eliminating the vertical bowing $B_{VERT}$. Stated otherwise, the positional tether 820 is to be drawn taut during deployment of the airbag cushion 810 from the housing 802 and pull or exert a force on the occupant-facing panel 812 in a manner to reduce curvature of the airbag cushion 810 in a frontal plane (from the perspective of the seating position, vertical relative to the vehicle) when the airbag cushion 810 is in an inflated deployed state. Reducing curvature of the knee airbag in the frontal plane can reduce rigidity of the occupant-facing panel at an occupant receiving area of the knee airbag. Reducing or eliminating the vertical bowing $B_{VERT}$ may reduce the possibility of the airbag cushion 810 prematurely engaging the lower legs of an occupant and thereby failing to become properly positioned to protect the occupant, or of the airbag cushion 810 causing injury to the occupant. The positional tether 820 may also transfer an amount of force on the vehicle-facing panel 814 to the occupant-facing panel 812.

Figure 10:
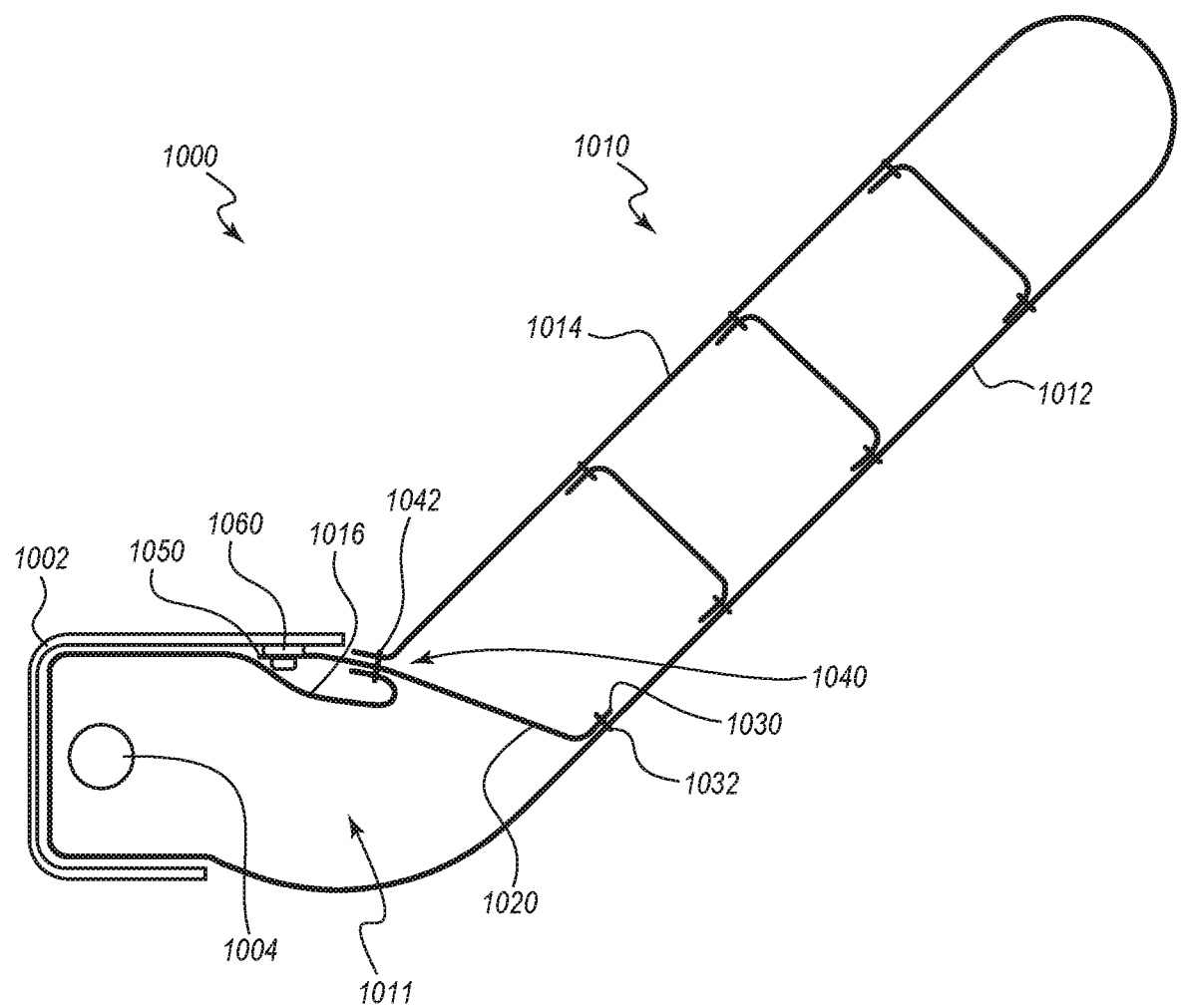
FIG. 10 is a partial side view of an inflatable knee airbag assembly, the airbag deployed and inflatable, similar to the airbag assembly of FIG. 2B and including an alternative mounting method for the airbag assembly.

FIG. 10 is a partial side view of an inflatable knee airbag assembly 1000. The embodiment of FIG. 10 includes an alternative mounting method for the knee airbag assembly 1000. An airbag cushion 1010 is shown deployed and inflated, similar to the knee airbag assembly 100 of FIG. 2B. A housing 1002 is mounted facing rearward rather than downward. In other words, the housing 1002 is oriented to initially deploy the airbag cushion 1010 in a rearward direction (rather than a downward direction). An inflator 1004 may be at least partially inside the housing 1002. The airbag cushion 1010 includes an occupant-facing panel 1012, a vehicle-facing panel 1014, and a throat panel 1016. The panels 1012, 1014, 1016 couple together to form an inflatable chamber 1011 of the airbag cushion 1010. An embodiment in which the housing 1002 is mounted facing rearward, the covering (not shown, but see, e.g., 106 in FIG. 1A) may be situated such that the airbag cushion 1010 deploys rearward rather than downward. The airbag cushion 1010 may include a positional tether 1020. The positional tether 1020 may couple at a first end 1030 to an interior surface of the occupant-facing panel 1012 at a distal interface 1032, then pass through the inflatable chamber 1011 of the airbag cushion 1010 to a transition port 1040, pass through the transition port 1040, then continue to couple at a second end 1050 to the housing 1002 via an anchor point(s) 1060. The positional tether 1020 may couple to the vehicle-facing panel 1014 and/or the throat panel 1016 at a transition interface 1042. In simple terms, a rearward-deployment embodiment may include any of the components, features, or functions described in this disclosure. In other words, a rearward-deployment embodiment (e.g., FIG. 10) may be analogized to FIGS. 1A-7E.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

It will be apparent to those having skill in the art that changes may be made to the details of the above-described embodiments without departing from the underlying principles of the present disclosure. Embodiments of the disclosure in which an exclusive property or privilege is claimed are defined as follows.

The invention claimed is:

1. An airbag assembly comprising:
   a housing to be mounted in a vehicle;
   an airbag in a packaged state within the housing, the airbag to receive inflation gas to expand and deploy from the housing to a deployed state, the airbag comprising:
     an occupant-facing panel, and
     a vehicle-facing panel coupled to the occupant-facing panel to form an inflatable chamber; and
   a positional tether coupled at a first end to an interior surface of the occupant-facing panel, the positional tether extending from within the inflatable chamber past an exterior surface of the vehicle-facing panel to couple at a second end to an anchor point that is external to the airbag, the first end of the positional tether to be rearward of the anchor point in the deployed state,
   wherein the positional tether is to be drawn taut during deployment to exert a force on the occupant-facing panel and alter deployment of the airbag from a first deployment trajectory to a second deployment trajectory, and
   wherein the airbag is a knee airbag.

2. The airbag assembly of claim 1, wherein the positional tether is to cause the airbag to curve toward the vehicle in the deployed state.

3. The airbag assembly of claim 1, wherein the positional tether extends through the vehicle-facing panel.

4. The airbag assembly of claim 1, wherein the positional tether is a single continuous segment to reach from the occupant-facing panel to the anchor point.

5. The airbag assembly of claim 1, wherein the positional tether comprises:
   a first segment extending from the interior surface of the occupant-facing panel and through the inflatable chamber to the vehicle-facing panel; and
   a second segment to extend from the vehicle-facing panel to the anchor point.

6. The airbag assembly of claim 5, wherein the first segment is distinct from and coupled to the second segment.

7. The airbag assembly of claim 6, wherein the first segment is directly attached to the second segment.

8. The airbag assembly of claim 1, further comprising a throat panel extending from the housing and coupled to the vehicle-facing panel, wherein the positional tether passes the exterior surface of the vehicle-facing panel between the throat panel and the vehicle-facing panel to extend to the anchor point.

9. The airbag assembly of claim 1, wherein the anchor point is fixed at the housing.

10. The airbag assembly of claim 1, wherein the first deployment trajectory is generally downward and rearward, and wherein the second deployment trajectory is upward and rearward.

11. The airbag assembly of claim 1, wherein the first end of the positional tether is disposed above a lowest point of the occupant=facing panel in the deployed state.

12. The airbag assembly of claim 1, wherein the positional tether is to curve the knee airbag upward into position forward of a seating position of the vehicle.

13. The airbag assembly of claim 1, wherein the housing is to be mounted in one of an instrument panel of the vehicle and a seat of the vehicle to be positioned forward of a seating position of the vehicle.

14. An inflatable knee airbag configured to deploy from a housing mounted to a component of a vehicle at a position below a knee position of a seating position of a vehicle, wherein the inflatable knee airbag comprises:

a first panel to initially deploy generally downward and rearward from the housing to be positioned facing the seating position of the vehicle;

a second panel to deploy from the housing to be positioned facing opposite the vehicle seating position of the vehicle and toward the component of the vehicle, the second panel coupled to the first panel to define an inflatable chamber of the inflatable knee airbag; and a positional tether coupled at a first end to an interior surface of the first panel, the positional tether extending past an exterior surface of the second panel to extend toward the component of the vehicle to couple at a second end to an anchor point external to the airbag and fixed relative to the component of the vehicle, wherein the anchor point is positioned forward of the first end of the positional tether in a deployed state, wherein the positional tether is to be drawn taut during deployment of the airbag from the housing to pull the first panel to curve rearward and upward toward the vehicle to cause the airbag to deploy in a curved configuration that bends in a direction of the anchor point.

15. The inflatable knee airbag of claim 14, wherein the positional tether is a single continuous segment to reach from the first panel to the anchor point.

16. The inflatable knee airbag of claim 14, wherein the positional tether extends from within the inflatable chamber through the second panel.

17. The inflatable knee airbag of claim 14, wherein the positional tether comprises:

a first segment extending from the interior surface of the first panel and through the inflatable chamber to the second panel; and a second segment to extend from the second panel to the anchor point.

18. The inflatable knee airbag of claim 17, wherein the first segment is distinct from and coupled to the second segment.

19. The inflatable knee airbag of claim 18, wherein the first segment is directly attached to the second segment.

20. The inflatable knee airbag of claim 14, further comprising a base panel to couple to and extend from the housing to couple to the second panel, wherein the positional tether passes the exterior surface of the second panel between the base panel and the second panel to extend to the anchor point.

21. The inflatable knee airbag of claim 14, wherein the anchor point is disposed on the housing.

22. The inflatable knee airbag of claim 14, wherein the component of the vehicle is one of an instrument panel of the vehicle and a seat of the vehicle.

23. The inflatable knee airbag of claim 14, wherein the positional tether is to be drawn taut during deployment of the airbag from the housing and pull the first panel to reduce curvature of the knee airbag outward away from the housing in a transverse plane.

24. The inflatable knee airbag of claim 23, wherein the reduction of curvature of the knee airbag in the transverse plane reduces rigidity of the first panel at an occupant receiving area of the knee airbag.

25. The inflatable knee airbag of claim 14, wherein the positional tether is to be drawn taut during deployment of the airbag from the housing and pull the first panel to reduce curvature of the knee airbag in a frontal plane.

26. An airbag assembly comprising:

an airbag to receive inflation gas to expand and deploy to a deployed state, the airbag comprising:
a first panel, and
a second panel coupled to the first panel to form an inflatable chamber; and a positional tether coupled at a first end to an interior surface of the first panel, the positional tether to, in the deployed state of the airbag, extend from within the inflatable chamber in a forward direction and past an exterior surface of the second panel to couple at a second end to an anchor point that is external to the airbag, the first end of the positional tether being disposed rearward of the anchor point in the deployed state, wherein the positional tether is to be drawn taut during deployment to exert a force on the first panel and alter the deployment of the airbag from a generally downward and rearward trajectory to an upward and rearward trajectory and cause the airbag in a fully deployed state to curve toward the anchor point.

27. An airbag assembly of claim 26, wherein the positional tether is to be drawn taut to exert a force on both the first panel and the second panel to cause the airbag in the deployed state to curve toward the anchor point.

* * * * *

UNITED STATES PATENT AND TRADEMARK OFFICE
CERTIFICATE OF CORRECTION

PATENT NO. : 10,618,494 B2
APPLICATION NO. : 15/445729
DATED : April 14, 2020
INVENTOR(S) : Gavin Francom Anae and Michael Jay Daines Page 1 of 1

It is certified that error appears in the above-identified patent and that said Letters Patent is hereby corrected as shown below:

In the Claims

Column 18, Line 58 reads, "the occupant=facing panel in the deployed state." which should read, "the occupant-facing panel in the deployed state."

Signed and Sealed this
Twenty-third Day of June, 2020

Andrei Iancu
*Director of the United States Patent and Trademark Office*